(12) United States Patent
Xu et al.

(10) Patent No.: US 11,119,652 B1
(45) Date of Patent: Sep. 14, 2021

(54) USING A STYLUS TO MODIFY DISPLAY LAYOUT OF TOUCHSCREEN DISPLAYS

(71) Applicants: Qiang Xu, Thornhill (CA); Jun Li, Markham (CA); Junwei Sun, Markham (CA); Chenhe Li, Markham (CA); Wei Li, Markham (CA); Gaganpreet Singh, Markham (CA)

(72) Inventors: Qiang Xu, Thornhill (CA); Jun Li, Markham (CA); Junwei Sun, Markham (CA); Chenhe Li, Markham (CA); Wei Li, Markham (CA); Gaganpreet Singh, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/867,204

(22) Filed: May 5, 2020

(51) Int. Cl.
  *G06F 3/0488* (2013.01)
  *G06F 3/0354* (2013.01)
  *G06F 3/0484* (2013.01)
  *G06F 3/0481* (2013.01)

(52) U.S. Cl.
  CPC ...... *G06F 3/04886* (2013.01); *G06F 3/03545* (2013.01); *G06F 3/04817* (2013.01); *G06F 3/04845* (2013.01); *G06F 2203/04803* (2013.01)

(58) Field of Classification Search
  CPC ............ G06F 3/04886; G06F 3/03545; G06F 3/04845; G06F 3/04817; G06F 2203/04803
  See application file for complete search history.

(56) References Cited

U.S. PATENT DOCUMENTS

| | | | |
|---|---|---|---|
| 2013/0222321 A1* | 8/2013 | Buening | G09G 5/14 345/173 |
| 2014/0340339 A1* | 11/2014 | Jung | G06F 3/03545 345/173 |
| 2015/0054751 A1 | 2/2015 | Hsiang et al. | |
| 2016/0085359 A1 | 3/2016 | Park et al. | |
| 2016/0342326 A1 | 11/2016 | Hinckley et al. | |
| 2020/0050308 A1* | 2/2020 | Lee | G06F 3/0354 |

FOREIGN PATENT DOCUMENTS

CN  104035704 A  9/2014

OTHER PUBLICATIONS

Su-Min Park et al., A New Stylus for Touchscreen Devices, Jan. 1, 2011, IEEE International Conference on Consumer Electronics, pp. 491-492 (Year: 2011).*

Chih-Lung Lin et al., Pressure Sensitive Stylus and Algorithm for Touchscreen Panel, Feb. 1, 2013, Journal of Display Technology, vol. 9, No. 1, pp. 17-23 (Year: 2013).*

(Continued)

*Primary Examiner* — Tam T Tran

(57) ABSTRACT

A method and system including sensing a touch event on a touchscreen display of an electronic device, and changing a display layout rendered on the touchscreen display in response to determining that the touch event matches a stylus shaft gesture that corresponds to interaction of the stylus shaft with the touchscreen display. The stylus shaft may be located between a first end and a second end of a stylus.

20 Claims, 19 Drawing Sheets

(56) References Cited

OTHER PUBLICATIONS

Lopes, P., Mendes, D., Araújo, B. and Jorge, J.A., Aug. 2011, Combining bimanual manipulation and pen-based input for 3D modelling. In Proceedings of the Eighth Eurographics Symposium on Sketch-Based Interfaces and Modeling (pp. 15-22). ACM.

Pfeuffer, K., Hinckley, K., Pahud, M. and Buxton, B., May 2017, Thumb+ Pen Interaction on Tablets. In Proceedings of the 2017 CHI Conference on Human Factors in Computing Systems (pp. 3254-3266). ACM.

Ramat, H., Henry Riche, N., Hinckley, K., Lee, B., Appert, C., Pietriga, E. and Collins, C., Apr. 2019, Activeink:(th) inking with data. In Proceedings of the 2019 CHI Conference on Human Factors in Computing Systems (p. 42). ACM.

Walker, G., 2012. A review of technologies for sensing contact location on the surface of a display. Journal of the Society for Information Display, 20(8), pp. 413-440.

Zhang, Y., Pahud, M., Holz, C., Xia, H., Laput, G., McGuffin, M., Tu, X., Mittereder, A., Su, F., Buxton, W. and Hinckley, K., Apr. 2019, Sensing Posture-Aware Pen+ Touch Interaction on Tablets. In Proceedings of the 2019 CHI Conference on Human Factors in Computing Systems (p. 55). ACM.

* cited by examiner

US 11,119,652 B1

USING A STYLUS TO MODIFY DISPLAY LAYOUT OF TOUCHSCREEN DISPLAYS

FIELD

This disclosure relates generally to touchscreen displays and the use of a stylus with touchscreen displays.

BACKGROUND

Electronic devices often have touchscreen displays to enable user interaction with the device. Users can input information through simple or multi-touch gestures by touching the touchscreen display with an input device such as a pen-style stylus or with one or more fingers. The large size and advanced hardware specifications of touchscreen displays enabled touchscreen enabled devices to become important tools for productivity. Users are able to perform multitasking by making use of the big space on touchscreen displays. For example, an electronic device can run multiple applications simultaneously and display information from those multiple applications simultaneously in multiple windows or views on a touchscreen display.

A common way for a user to interact with a touchscreen display is to through touch gestures using fingers or the end of a pen-style stylus. By way of example, gestures and their corresponding descriptions that can be recognized by the Microsoft Surface™ operating system based on finger-based touch events include: "Tap: Press and then release"; "Slide or Push: Move a displayed object under finger with a sliding or pushing action: "Flick: Press, slide quickly, and then release"; "Touch-and-turn: Slide finger on the content around a point of the content"; "Spin: Twist quickly to rotate the object"; "Pull apart Stretch: Pull fingers apart on two hands"; "Push together Shrink: Bring fingers together on two hands"; "Twist: Twist the object with two or more fingers, like turning a knob or paper"; "Pinch: Bring two fingers together on one hand"; "Squeeze: Bring three or more fingers together on one hand"; "Spread: Pull fingers apart on one hand" and "Pin turn: Pin the object in place with one finger while the other finger drags the object around the pinned point".

As evidenced from the above list, other than basic tap and drag gestures that can be performed using a stylus tip, most touchscreen interactions require finger based gestures, with the result that users who want to use a stylus often have to switch to figure gestures to take advantage of advanced touch screen capability. Many users do not utilize some of the display management functionality offered by a touchscreen display since many existing supported touch gestures involve too many steps that are not intuitive.

Accordingly, there is a need for a more versatile way of managing viewing areas of a touchscreen display on electronic devices.

SUMMARY

The present disclosure generally relates to the use of a stylus with a touchscreen display to enable input interactions that allow a touchscreen display layout to be modified, including for example input interactions that enable screen splitting and management of split screen views.

According to an aspect of the present disclosure, there is provided a method that includes sensing a touch event on a touchscreen display of an electronic device; and changing a display layout rendered on the touchscreen display in response to determining that the touch event matches a stylus shaft gesture that corresponds to interaction of the stylus shaft with the touchscreen display, the stylus shaft located between a first send and a second end of a stylus.

The method enables efficient user interactions with an electronic device through the use of stylus shaft gestures. This may, for example, allow desired screen display layout to be displayed with fewer user interactions, thereby reducing possible wear or damage to the electronic device and possibly reducing battery power consumption. User experience may also be enhanced, and additional functionality provided by the electronic device.

In the preceding aspect, changing the display layout comprises changing a number of viewing areas presented on the touchscreen display or changing relative sizes of viewing areas presented on the touchscreen display.

In at least some of the preceding aspects, determining that the touch event matches the stylus shaft gesture comprises determining that touch coordinate information for the touch event matches a stylus shaft placement gesture that corresponds to placement of the stylus shaft on a screen of the touchscreen display within a first viewing area, wherein changing the display layout rendered on the touchscreen display comprises splitting the first viewing area into a second viewing area and a third viewing area, and causing each of the second and third viewing area to display a respective user interface.

In at least some of the preceding aspects, the second viewing area and third viewing area are arranged relative to each other as a left viewing area and a right viewing area when the stylus shaft placement gesture corresponds to placement of the stylus shaft in a vertical direction within the first viewing area.

In at least some of the preceding aspects, the second viewing area and third viewing area are arranged relative to each other as a top viewing area and a bottom viewing area when the stylus shaft placement gesture corresponds to placement of the stylus shaft in a horizontal direction within the first viewing area.

In at least some of the preceding aspects, at least one of the user interfaces within the second viewing area and the third viewing area corresponds to an application that was a background application when the touch event occurs, the method comprising causing the background application to become a foreground application upon determining that the touch event matches the stylus shaft placement gesture.

In at least some of the preceding aspects, at least one of the user interfaces within the second viewing area and the third viewing area corresponds to an application that was an inactive application when the touch event occurs, the method comprising causing the inactive application to become a foreground application on determining that the touch event matches the stylus shaft placement gesture.

In at least some of the preceding aspects, at least one of the user interfaces within the second viewing area and the third viewing area displays a group of icons that can each be respectively actuated to launch a corresponding application.

In at least some of the preceding aspects, determining that the touch event matches a stylus shaft gesture comprises determining that touch coordinate information for the touch event matches a stylus shaft drag gesture that corresponds to movement along a screen of the touchscreen display of the stylus shaft from a location that coincides with a border between a first viewing area and a second viewing area, and wherein changing the display layout rendered on the touchscreen display comprises resizing relative sizes of the first viewing area and the second viewing area based on the movement of the stylus shaft along the screen.

In at least some of the preceding aspects, determining that the touch event matches a stylus shaft gesture comprises determining that, when a first viewing area and a second viewing area are displayed on the touchscreen display, touch coordinate information for the touch event matches a stylus shaft drag and remove gesture that corresponds to movement along a screen of the touchscreen display of the stylus shaft within a first viewing area and subsequent removal of the stylus shaft from the screen within a threshold time period of the movement, and wherein changing the display layout rendered on the touchscreen display comprises enlarging the first viewing area and closing the second viewing area.

According to another aspect of the present disclosure, there is provided an electronic device that is configured to perform the method of any of the preceding example aspects.

According to still another aspect of the present disclosure, there is provided an electronic device that includes a touchscreen display comprising a display and a touch sensing system configured to generate signals corresponding to screen touches of the display; a processing device operatively coupled to the touchscreen display; and a non-transitory memory coupled to the processing device and storing software instructions that when executed by the processing device configure the processing device to: sense a touch event on the touchscreen display based on signals generated by the touch sensing system, determine if the touch event matches a stylus shaft gesture, and change a display layout rendered on the touchscreen display in response to determining that the touch event matches a stylus shaft gesture that corresponds to interaction of the stylus shaft with the display, the stylus shaft located between a first end and a second end of the stylus.

According to a to still another aspect of the present disclosure, there is provided a computer readable medium storing instructions which when executed by a processor of an electronic device, configures the electronic device to: sense a touch event on a touchscreen display of an electronic device; and change a display layout rendered on the touchscreen display in response to determining that the touch event matches a stylus shaft gesture corresponding to interaction of the stylus shaft with the touchscreen display, the stylus shaft located between a first end and a second end of a stylus.

In at least some of the forgoing example aspects, the ability to process stylus shaft gestures may improve the operation of an electronic device and the user experience with the electronic device. For example, a user may be able to replace some finger interactions with a touchscreen display with stylus interactions, thereby reducing potential transfer of foreign substances such as dirt, grease, oil and other contaminants (including for example bacteria and viruses) from the user's fingers to the touchscreen display. Reduced contaminants on the screen may in some cases reduce cleaning requirements for the touchscreen display thereby reducing possible damage to the device, reducing the consumption of cleaning materials, and may also reduce the spread of contaminates.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

Figure 1:
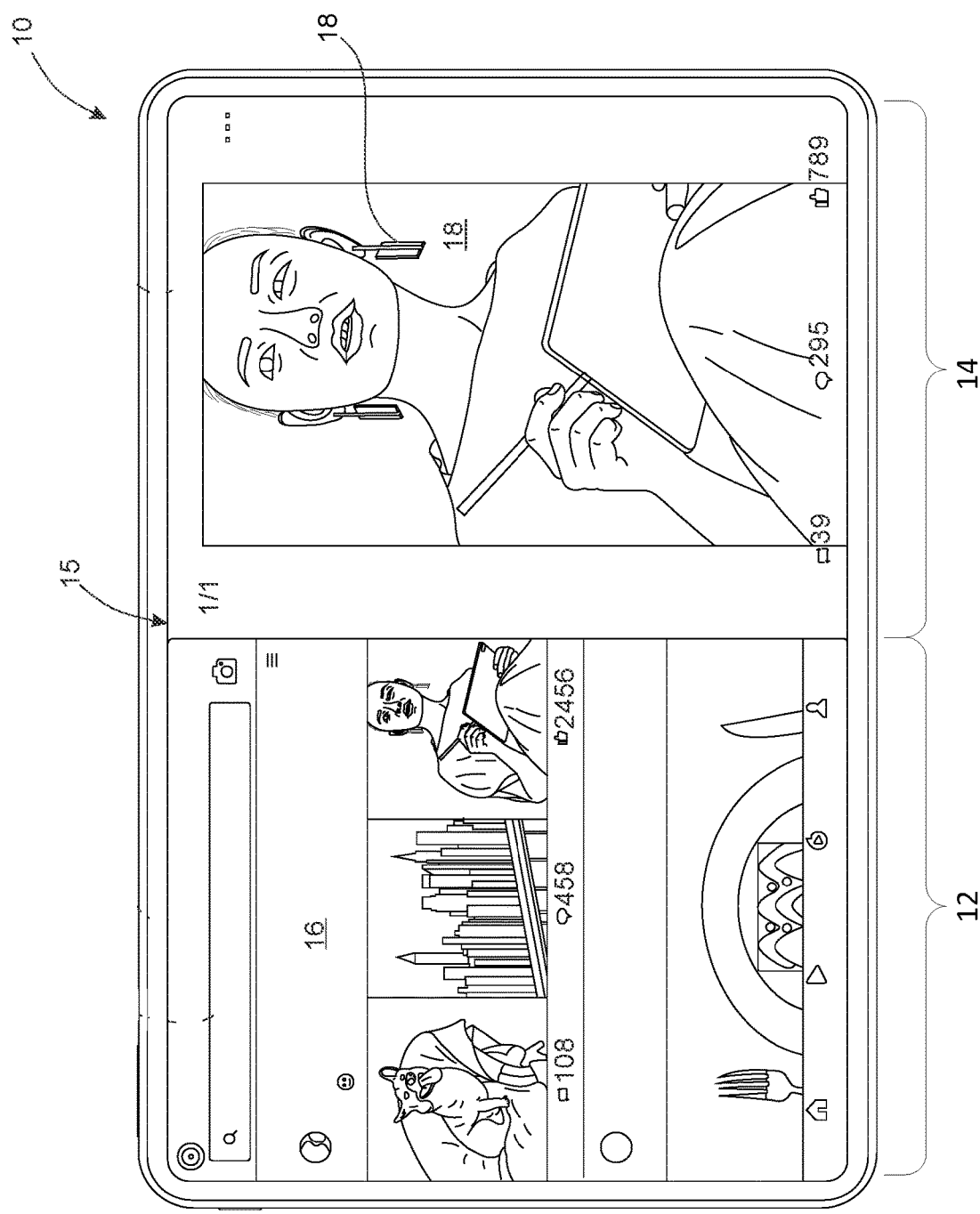
FIG. 1 is a prior art tablet running two applications and displaying the applications' user interfaces in two viewing areas of a display thereof.

In this disclosure the term "electronic device" refers to an electronic device having computing capabilities. Examples of electronic devices include but are not limited to: personal computers, laptop computers, tablet computers ("tablets"), smartphones, surface computers, augmented reality gear, automated teller machines (ATM)s, point of sale (POS) terminals, and the like.

In this disclosure, the term "display" refers to a hardware component of an electronic device that has a function of displaying graphical images, text, and video content thereon. Non-limiting examples of displays include liquid crystal displays (LCDs), light-emitting diode (LED) displays, and plasma displays.

In this disclosure, a "screen" refers to the outer user-facing layer of a touchscreen display.

In this disclosure, the term "touchscreen display" refers to a combination of a display together with a touch sensing system that is capable of acting as an input device by receiving touch input. Non-limiting examples of touchscreen displays are: capacitive touchscreens, resistive touchscreens, and Infrared touchscreens and surface acoustic wave touchscreens.

In this disclosure, the term "touchscreen-enabled device" refers to an electronic device equipped with a touchscreen display.

In this disclosure, the term "touch event" refers to an event during which a physical object is detected as interacting with the screen of a touchscreen display.

In this disclosure, the term "viewing area" or "view" refers to a region of a display, which may for example be rectangular in shape, which is used to display information and receive touch input.

In this disclosure, the term "main viewing area" or "main view" refers to the single viewing area that covers all or substantially all (e.g., greater than 95%) of the viewable area of an entire display area of a touchscreen display.

In this disclosure, the term "separator" refers to a linear display feature, for example a line that visually separates two adjacent viewing areas that are displayed simultaneously on touchscreen display. Examples of separators include a vertical separator such as one or more vertical lines that provide a border separating a right and a left viewing areas, and a horizontal separator such as one or more horizontal lines that provide a border separating a top viewing area and a bottom viewing area. The separator may or may not explicitly display a line demarking the border between first and second viewing areas.

In this disclosure, the term "split mode" and refers to a touchscreen display mode in which a viewing area such as a main viewing area has been split. A "vertical split mode" refers to mode in which a viewing area is split into a right viewing area and a left viewing area. A "horizontal split mode" refers to a mode in which a viewing area is split into a top viewing area and a bottom viewing area.

In this disclosure, the term "display layout" refers to the configuration of viewing areas rendered on a display. For example, the main viewing area may have a display layout in which it is in a vertical split mode or a horizontal split mode, or a combination thereof.

In this disclosure, a "window" refers to a user interface form showing at least part of an application's user interface.

In this disclosure, the term "application" refers to a software program comprising of a set of instructions that can be executed by a processing device of an electronic device.

In this disclosure, the terms "running application" and "active application" refer to the status of an application which resides in memory and having its instructions executing by a processing device of an electronic device;

In this disclosure, the term "inactive application" refers to an application which resides in memory but is not an active application or a running application but is capable of being launched into an "active" or "running" state.

In this disclosures, the terms "starting" and "launching" an application refers to taking the application from the inactive state to the running state. Starting an application may be effected by tapping an icon, performing a swipe, issuing a voice command, or any other method known in the art.

In this disclosure, the term "executing" and "running" refer to executing, by a processing device, at least some of the plurality of instructions comprising an application.

In this disclosure, the expression "actuating an icon" refers interacting with an icon to launch a corresponding application that is represented by the icon.

In this disclosure, the term "foreground application" refers to an application that is running in the foreground on an electronic device. An application is said to be running in the "foreground" or in "foreground mode" on an electronic device, when the application is being executed by a processor of the electronic device and the application displays a user interface thereof on a display of that electronic device. The user interface may be in a window or another user-interface element such as a ticker.

In this disclosure, the term "background application" refers to an application that is running in the background on an electronic device. An application is said to be running in the "background" or in "background mode" on an electronic device, when the application is being executed by the processor of the electronic device, but the application does not display a user interface thereof on the touchscreen display of the electronic device. As an example of a background application, an alarm notification application may be set and starts running while its user interface is not displayed until the alarm goes off at which point its user interface pops up on the touchscreen display. Another example of a background application is a first application that was running when a second application gets maximized to occupy the entire display of the electronic device thus forcing the first application to run in the background without displaying a user interface. Yet another example of a background application is an application that has been minimized by a user to only appear on a task bar on the touchscreen display of the electronic device.

In this disclosure, the term "home screen user interface" refers to user interface content displayed by an operating system on the touchscreen display of an electronic device that enables a user to launch applications and functions on the electronic device. A home screen user interface typically displays icons for the various applications available to run on the electronic device. However, a home screen user interface may also include other user interface elements such as tickers, widgets, search field and the like.

In this disclosure, the terms "top", "bottom", "right", "left", "horizontal" and "vertical" when used in the context of viewing areas of a display are relative to the orientation of the display when content currently displayed on the display is presented in an orientation that the content is intended to be viewed in.

Known electronic devices allow splitting of a main display area into multiple viewing areas. In some examples, these viewing areas may correspond to respective windows. For example, FIG. 1 depicts an example prior art tablet 10 having a display 15. The main viewing area of display 15 is split into a left viewing area 12 and a right viewing area 14. The left viewing area 12 is displaying content that is a user interface 16 of a first application, such as a web browser. The right viewing area 14 is displaying content that is the user interface 18 of a second application, such as a photo viewer.

Figure 2:
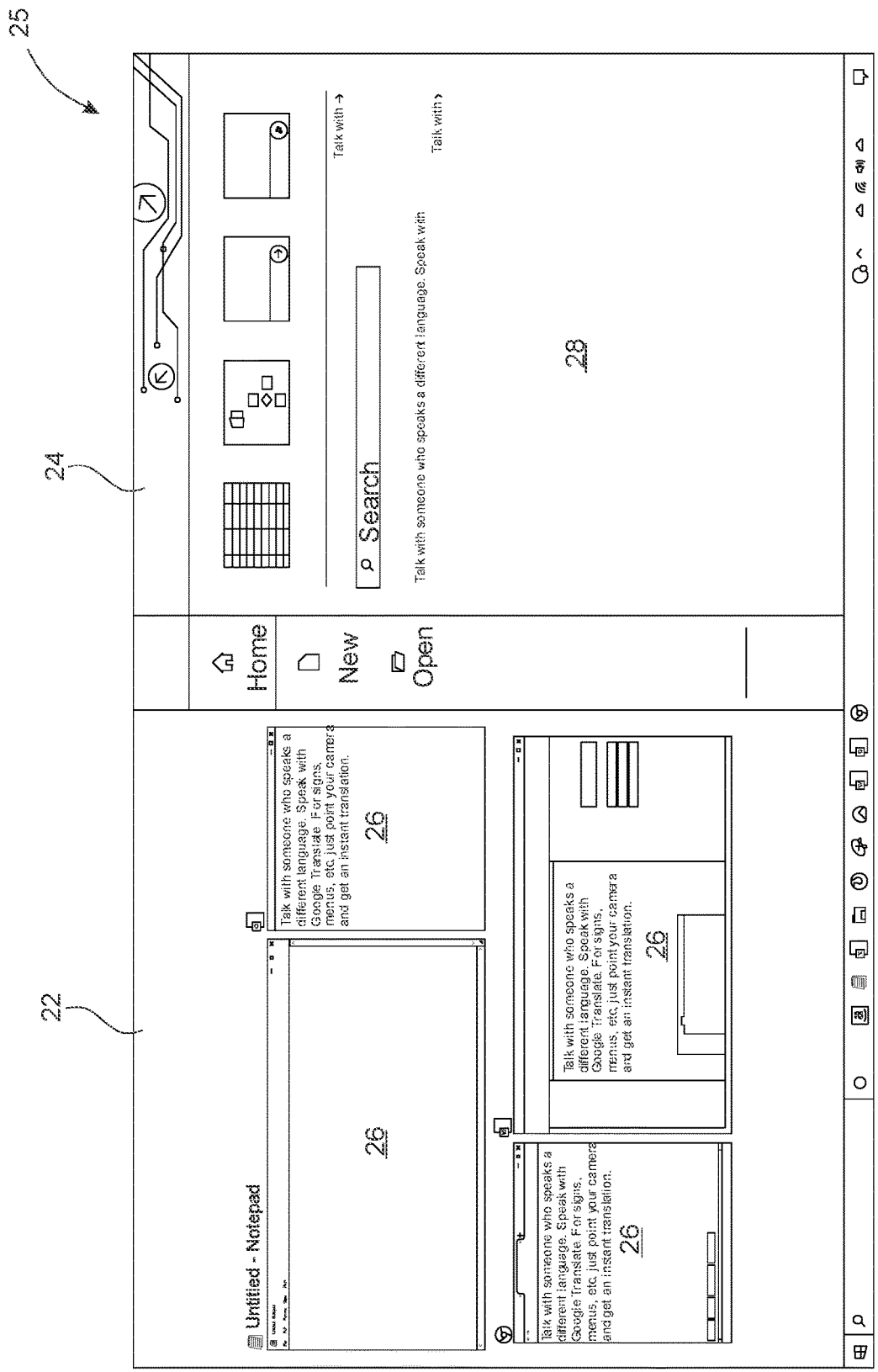
FIG. 2 shows a prior art touchscreen display having two viewing areas created by dragging a window towards one end of the display.

With reference to FIG. 2, a different prior art example of splitting a main viewing area of a touchscreen display 25 into two viewing areas is shown. The main viewing area of the touchscreen display 25 has been split into a left viewing area 22 and a right viewing area 24. A user has dragged an application window 28 to the right end of the touchscreen display 25. As such the application window 28 has been maximized to occupy the right viewing area 24 of the touchscreen display 25. On the left viewing area 22, a plurality of window screenshots 26 each representing an actively running application are shown. The user can choose from the plurality of window screenshots 26 to select an application they wish to maximize to occupy the left viewing area 22.

Figure 3:
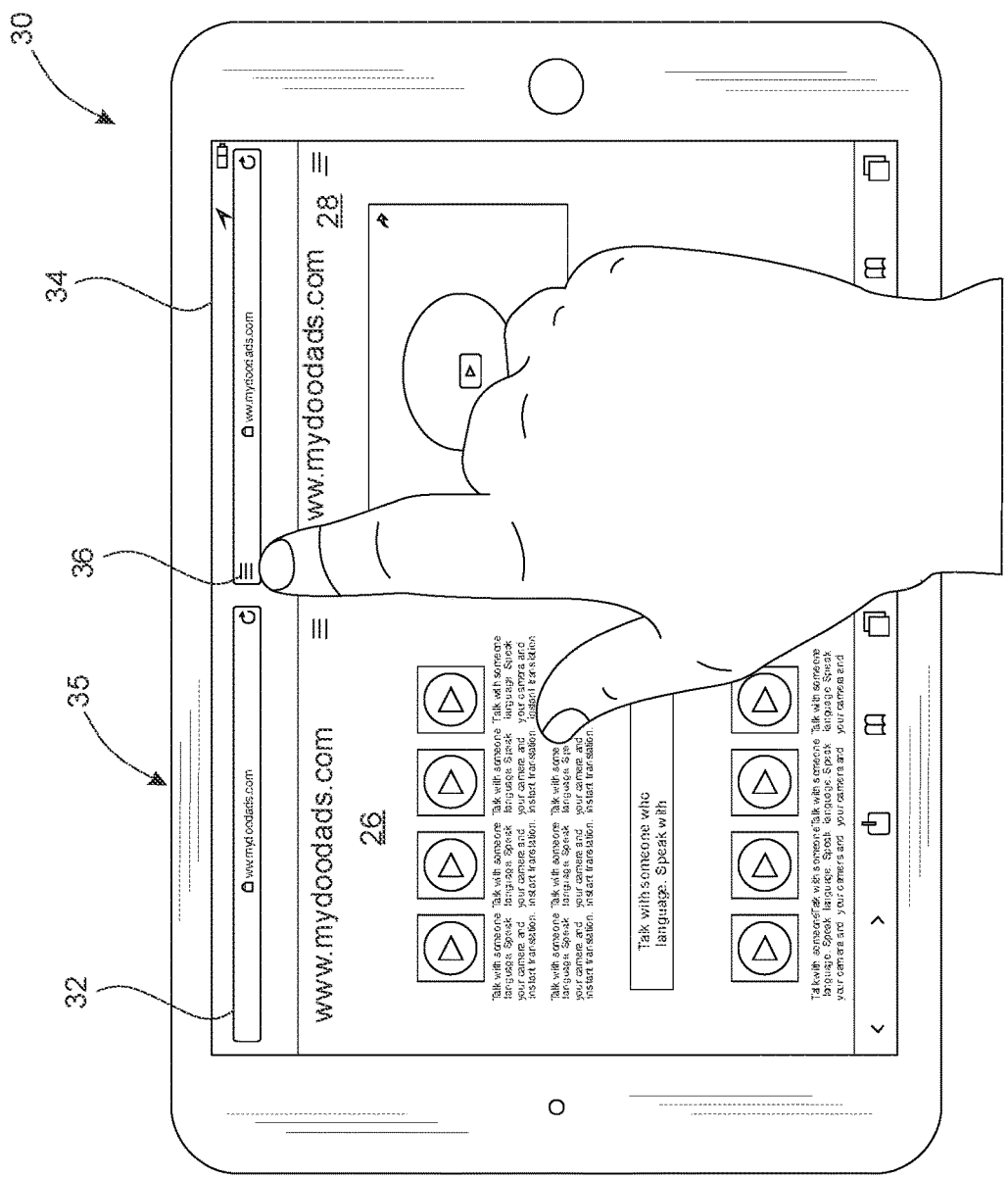
FIG. 3 shows resizing of a viewing area on a prior art touchscreen display by dragging the viewing area's border with fingers.

FIG. 3 shows a prior art example of resizing the viewing areas of a touchscreen display. An electronic device such as a tablet 30 has a touchscreen display 35 having its main viewing area divided into two viewing areas. The left viewing area 32 shows a first application window 26, while the right viewing area 34 shows a second application window. A user is attempting to resize the two viewing areas. For example, if the user wishes to make the right viewing area 34 smaller, the user touches and drags the separator 36, which separates the two viewing areas, to the right. As a result the right viewing area 34 may have a smaller width, while the left viewing area 32 may have a larger width and expands towards the right to fill the space which is no longer used by the right viewing area 34.

Figures 4A, 4B:
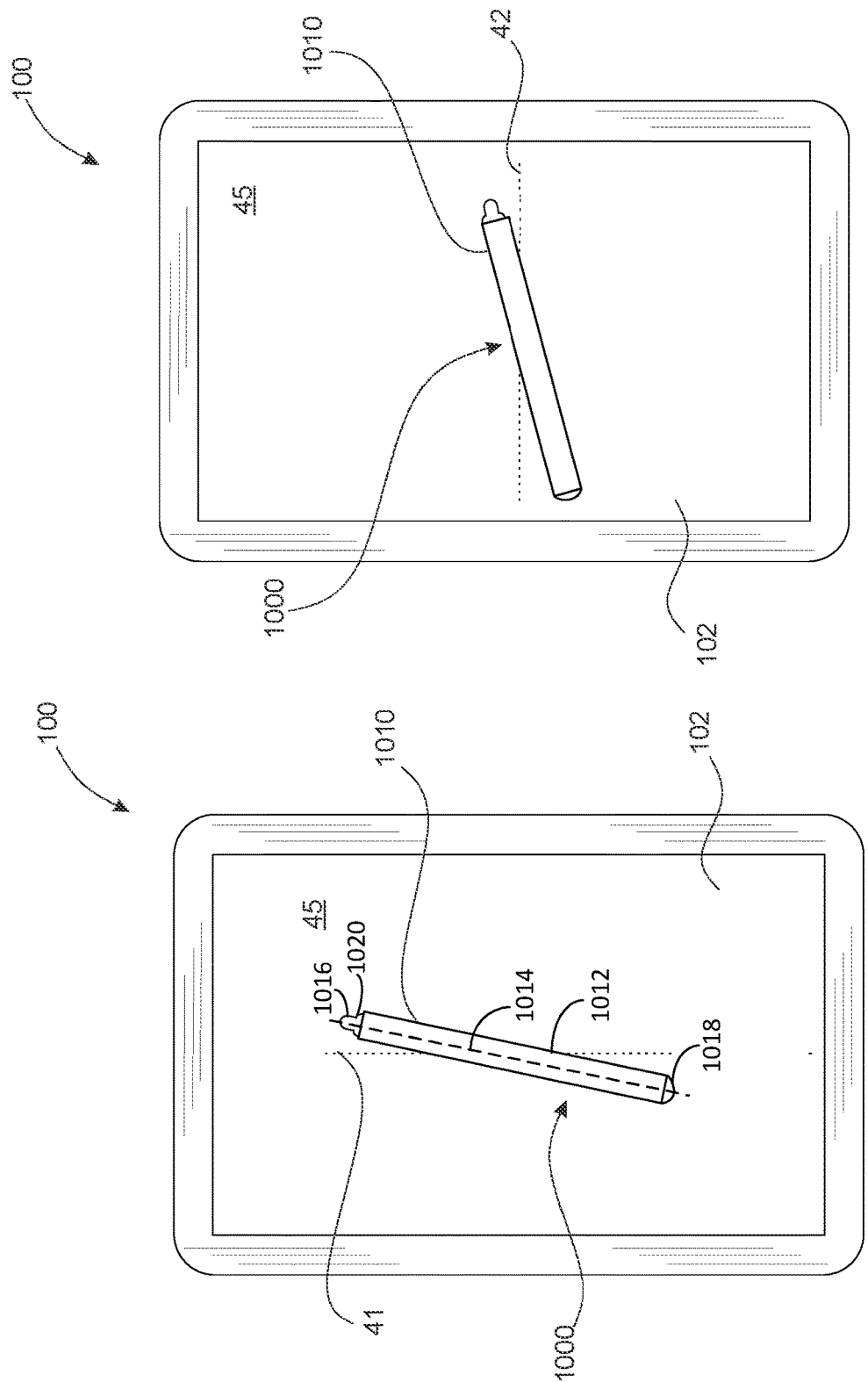
FIG. 4A shows an electronic device employing a touchscreen display, wherein the shaft of a stylus is placed on the screen of the touchscreen display in a generally vertical orientation.
FIG. 4B shows the electronic device of FIG. 4A wherein the shaft of the stylus is placed on the screen of a touchscreen display in a generally horizontal orientation.

In example embodiments, an electronic device and a stylus are cooperatively configured to enable the display layout of information displayed on a touchscreen display of the electronic device to be modified based on interaction of the shaft of the stylus with the touchscreen display. In this regard, FIGS. 4A and 4B, show an electronic device 100, which in the illustrated examples is a tablet device, having a touchscreen display 45, together with a touch input tool, namely stylus 1000, accordingly to example embodiments. In example embodiments, the stylus 1000 is an inanimate object styled like a pen, having a rigid body 1012 that extends along an elongate axis 1014 from a first axial end 1016 to a second axial end 1018. The rigid body 1012 includes a stylus shaft 1010 that extends along elongate axis 1014 and is located between the first end 1016 and second end 1018 of the body 1012. In example embodiments, the stylus shaft 1010 can allow a user to grip the stylus and is cylindrical or cuboid shaped along its length. Stylus 1000 may have a tapered tip 1020 provided at one or more of the axial ends 1016, 1018 of the body 1012. The tip 1020 may be used to actuate user-interface elements on a touchscreen display. In some examples, stylus 1000 may also incorporate a writing pen. For example, stylus 1000 may have an ink-dispensing writing tip at an opposite end than the tip 1020.

In example embodiments, electronic device 100 is configured to enable non-tip portions of the stylus 1000, namely stylus shaft 1010, to be used to provide touch input to touchscreen display 45. In this regard, in FIGS. 4A and 4B, stylus 1000 is placed on a portion of the touchscreen display 45 such that the elongate axis 1014 of stylus shaft 1010 is parallel to a viewing surface of the screen of touchscreen display 45. In some embodiments, the shaft 1010 has a plurality of contact points which are spaced apart along the shaft 1010 for contacting the screen. In other embodiments, a continuous portion of the length of the shaft 1010 is configured to contact with the screen.

Figure 4C:
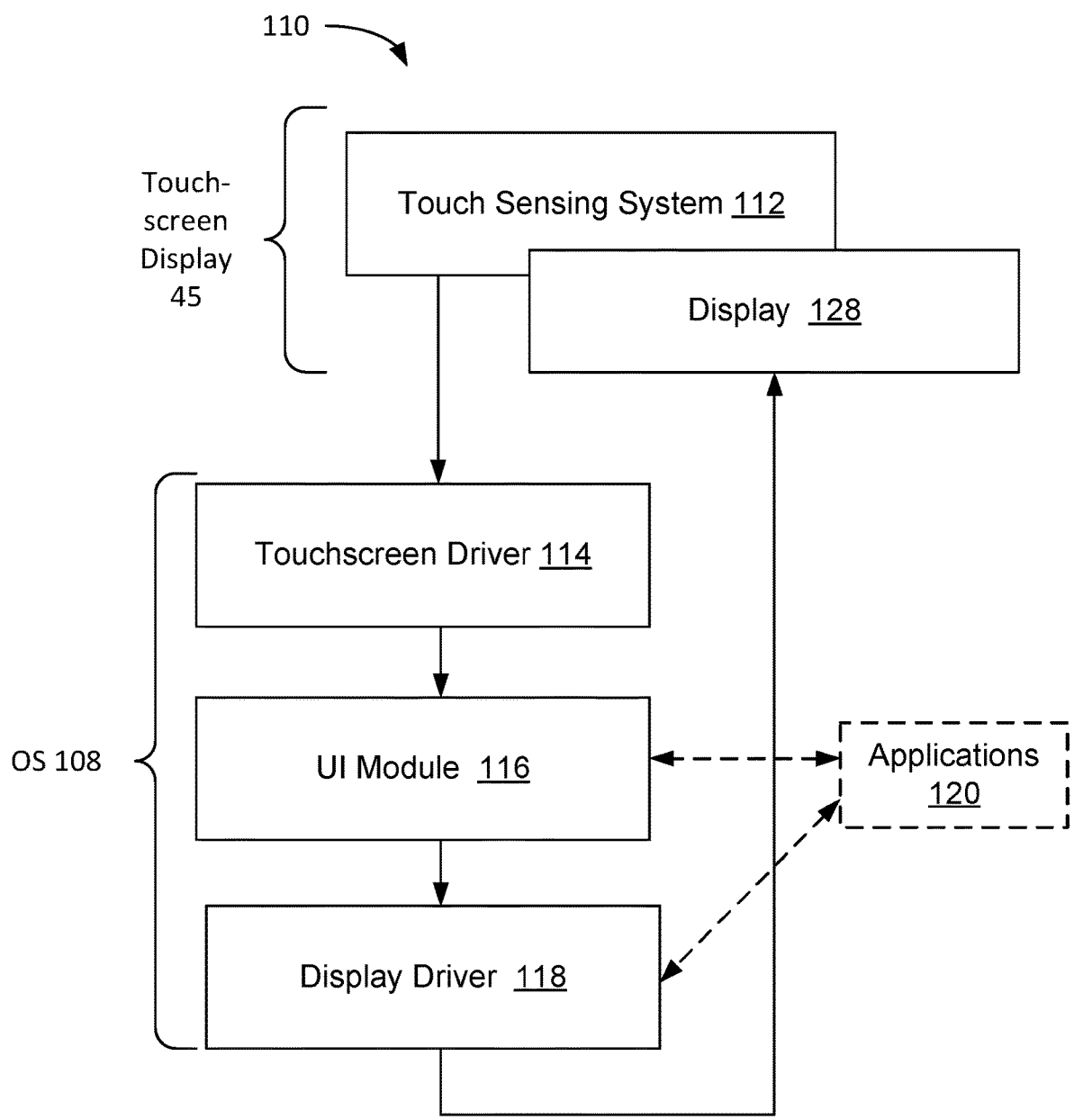
FIG. 4C is a block diagram of selected components of a touchscreen display system of the electronic device of FIGS. 4A and 4B, according to example embodiments.

FIG. 4C shows selected hardware and software components of a touchscreen display system 110 of the electronic device 100 for detecting and processing information about interaction of the stylus 1000 with the touchscreen display 45. The hardware components of the touchscreen display system 110 include the touchscreen display 45, which includes a display 128, and a touch sensing system 112 for detecting touch interactions with the screen of the display 128.

Different technologies known in the art can be used to implement touch sensing system 112 in different example embodiments.

In one example embodiment, touchscreen display 45 is a capacitive touchscreen display such as a surface capacitive touchscreen and the touch sensing system 112 is implemented by a screen that stores an electrical charge, together with a monitoring circuit that monitors the electrical charge throughout the screen. When the capacitive screen of display 128 is touched by a conductive object that is capable of drawing a small amount of the electrical charge from the screen, the monitoring circuit generates signals indicating the point(s) of contact for the touch event. In example embodiments that use a capacitive touchscreen display, the shaft 1010 of the stylus 1000 is specially configured to enable the presence of the shaft 1010 on the screen of display 128 to be detected by the touch sensing system 112. In this regard, in some example embodiments the shaft 1010 includes one or more screen contact points that can transfer an electrical charge. For example, the shaft 1010 may include conductive contact points which are spaced apart along the shaft 1010 for contacting the screen. The conductive contact points may be electrically connected to one or more human user contact surfaces on the stylus 1000 that allow a conductive path from a human user to the conductive contact points. In some embodiments, a continuous portion of the length of the shaft 1010 may have a conductive element configured to contact with the screen. In some examples, the touchscreen display 45 may be a projected capacitance touchscreen display rather than a surface touchscreen display, in which case a touch event such as a stylus placement gesture may occur when the stylus 1000 is sufficiently close to the screen to be detected without actual physical contact.

In a further example embodiment, touchscreen display 45 is a resistive touch screen and the touch sensing system 112 includes a screen that comprises a metallic electrically conductive coating and resistive layer, and a monitoring circuit generates signals indicating the point(s) of contact based on changes in resistance.

In a further example embodiment, touchscreen display 45 is a SAW (surface acoustic wave) or surface wave touchscreen and touch sensing system 112 sends ultrasonic waves and detects when the screen is touched by registering changes in the waves. In such embodiments the acoustic wave absorbing material is provided on the shaft 1010 of stylus 1000

In yet further example embodiment, touchscreen display 45 is an Infrared touch screen and the touch sensing system 112 utilizes a matrix of infrared beams that are transmitted by LEDs with a phototransistor receiving end. When an object is near the display, the infrared beam is blocked, indicating where the object is positioned.

In each of the above examples, the touch sensing system 112 generates digital signals that specify the point(s) of contact of an object with the screen of the display 128 for a touch event. These digital signals are processed by software of the touchscreen display system 110, which in an example embodiment may be part of operating system (OS) 108 of the electronic device 100. For example, the OS 108 can include a touchscreen driver 114 that is configured to convert the signals from touch sensing system 112 into spatial touch coordinate information that specifies a physical location of object contact point(s) on the screen of display 128 (for example a set of multiple X and Y coordinates that define a position of the stylus shaft 1010 relative to a defined coordinate system of the touchscreen display 45). In example embodiments the spatial coordinate information generated by touchscreen driver 114 is provided to a user interface (UI) module 116 of the OS 108 that associates temporal information (e.g., start time and duration) with the spatial coordinate information for a touch event, resulting in touch coordinate information that includes spatial coordinate information and time information. The UI module 116 is configured to determine if the touch coordinate information matches a touch pattern from a set of candidate touch patterns, each of which corresponds to a respective touch input action, commonly referred to as a gesture. In example embodiments, the set of multiple X and Y coordinates that define a position of the stylus shaft 1010 relative to a defined coordinate system of the touchscreen display 45 can be used to determine a shape of the stylus shaft 1010. Thus, touch coordinate information can in some examples indicate a shape of one or more stylus shaft contact areas, and the set of candidate touch patterns may include patters that match a stylus shape.

In example embodiments, in addition to detecting and recognizing conventional finger and stylus tip gestures such as the Microsoft Surface™ gestures noted above, the UI module 116 is configured identify, based on touch coordinate information, stylus shaft gesture touch events that match touch patterns that correspond to: (1) placement of the shaft 1010 of stylus 1000 on the screen of display 128 ("stylus shaft placement gesture"); (2) movement of the shaft 1010 of stylus 1000 on the screen of display 128 of touchscreen display 45 ("stylus shaft drag gesture" in the case of a linear movement, and "stylus shaft rotation gesture" in the case of a rotational movement") and (3) removal of the shaft 1010 of stylus 1000 from the screen of display 128 ("stylus shaft removal gesture"). In example embodiments, described in greater detail below, the UI module 116 is configured to further classify the above gestures based on the location, orientation and timing of such stylus shaft gestures. Thus, the touch coordinate information derived by the touchscreen driver 114 from the signals generated by touch sensing system 112 includes information about the location, orientation and shape of an object that caused a touch event, and timing information about the touch event. That information can be used by UI module 116 to classify the touch event as a particular stylus shaft gesture from a set of possible gestures, each of which has a respective predefined touch pattern.

In example embodiments, based on at least one of the type and location of a detected stylus shaft gesture, the UI module 116 is configured to alter a display layout of information rendered on the display 128 by providing instructions to a display driver 118 of the OS 108. In example embodiments, components of the OS 108 such as the UI module 116 interact with UI components of other software programs (e.g., other applications 120) to coordinate the content that is displayed in viewing areas on the display 128.

Referring again to FIGS. 4A and 4B, examples of stylus shaft gestures that can be detected by touchscreen display system 110 will now be described. FIGS. 4A and 4B correspond respectively to a vertical stylus shaft placement gesture and a horizontal stylus shaft placement gesture. In illustrated example, of FIGS. 4A and 4B, the electronic device 100 is shown in what is commonly referred to as a "portrait orientation mode" in which the shorter dimension of the rectangular touchscreen display 45 defines the width (e.g. distance from left edge to right edge) of a main viewing area and the longer dimension of the rectangular touchscreen display 45 defines the height (e.g., distance from top edge to bottom edge) of the main viewing area. In example embodiments, the electronic device 100 can also operate in a "landscape orientation mode" in which the shorter dimension of the rectangular touchscreen display 45 defines the vertical height of a main viewing area and the longer dimension of the rectangular touchscreen display 45 defines the horizontal width of the main viewing area. The dotted vertical line 41 of FIG. 4A is a vertical virtual line splitting the main viewing area of the touchscreen display 55 into a right viewing area and a left viewing area, and represents a touch pattern corresponding to a vertical stylus shaft placement gesture. In FIG. 4A, the stylus 1000 is placed on the screen of touchscreen display 45 such that the stylus shaft 1010 is substantially parallel to and generally coincides with the touch pattern represented by vertical virtual line 41. The touch sensing system 112 generates signals that corresponds to a sensed location of the shaft 1010 on the touchscreen display 45. Touchscreen driver 114 translates these signals into spatial touch coordinate information. In the illustrated example, UI module 116 compares the touch coordinate information against a number of predetermined touch patterns and determines that the touch coordinate information corresponds to a touch pattern (represented by virtual line 41), for a vertical stylus shaft placement gesture located at a vertical center of the touchscreen display 45. In example embodiments, the UI module 116 allows for some deviation between the orientation of the stylus 1000 and the touch pattern represented by virtual vertical line 41. For example, the touchscreen UI module 116 may consider an angle of up to +/−20 degrees between an elongate axis of the shaft of the stylus 1000 and the vertical virtual line 41 to be a negligible angle. As such a stylus 1000 placed such that its shaft 1010 is parallel to the virtual vertical line 41 or deviating up to a threshold orientation deviation amount (e.g., 20 degrees) from that orientation is considered to match the touch pattern represented by virtual vertical line 41, which corresponds to a vertical stylus shaft placement gesture. Similarly, the dotted horizontal line 42 of FIG. 4B is a virtual horizontal line representing the touch pattern for a horizontal stylus shaft placement gesture on the main viewing area of the touchscreen display 45. The placement of the stylus 1000 on the virtual line 42 or with an angle of deviation between the elongate axis of shaft 1010 of the stylus 1000 and the touch pattern represented by horizontal virtual line 42 of up to the defined orientation deviation threshold (e.g., 20 degrees) is considered to be a placement of the stylus 1000 in a substantially or generally horizontal orientation in a center location on the main viewing area of the touchscreen display 45.

In addition to or instead having a defined angle value tolerance for orientation deviation, the UI module 116 may also be configured to apply a distance deviation threshold in cases where the proximity of the stylus shaft gesture is determined relative to a displayed landmark (e.g. a separator as described below). For example, UI module 116 may consider a stylus shaft 1010 to be placed at or coincident with an displayed landmark if the closest part of the stylus shaft 1010 is within a distance deviation threshold of any part of the landmark (e.g., within a horizontal distance of up to 20% of the total screen width and a vertical distance of up to 20% of the total screen width). In some examples, the distance deviation threshold could be based on an averaging or mean over a length of the stylus shaft relative to a length of the landmark. In some examples, both a defined angle orientation deviation threshold and a distance deviation threshold may be applied in the case of determining if a stylus shaft placement is located or coincides with a displayed landmark that has relevant location and orientation features (e.g., do touch coordinates for a stylus shaft placement gesture fall within the orientation deviation threshold from a separator and within the distance threshold of the separator).

The spatial deviation thresholds indicated above are examples. Other threshold values can be used, and in some examples may be user defined. Deviation thresholds may also be applied when classifying movement gestures—for example, in some embodiments a stylus shaft drag gesture need not be perfectly linear and could be permitted to include a threshold level of on-screen rotation of the stylus shaft 1010 during the movement. Similarly, a stylus shaft rotation gesture need not be perfectly rotational and could be permitted to include a threshold level of linear on-screen drag of the stylus shaft 1010 during the movement. In some examples, an on-screen movement that exceeded both the on-screen rotation and on-screen liner movement thresholds may be classified as a combined on-screen "stylus shaft drag and rotate gesture".

In example embodiments, the touch pattern classification performed by UI module 116 may be a multiple step process. For example, the UI Module 116 may be configured to first classify if the touch coordinate information matches a generic touch pattern for placement of the stylus shaft 1010 on the touchscreen display 45. For example, touch coordinate information matching a touch pattern that corresponds to placement of an elongate rigid body at any location or orientation on the touchscreen display 45 may be classified as a stylus shaft placement gesture. An orientation (e.g., horizontal or vertical) determined from the touch coordinate information can then be used to further classify the stylus shaft gesture as vertical or horizontal stylus shaft placement gesture, and define the location of the placement stylus gesture relative to a landmark. As indicated above, in addition to stylus shaft placement gestures, on-screen movement stylus shaft gestures and stylus shaft removal gestures can also be detected and classified.

Display layout modifications undertaken by touchscreen display system 110 in response to detected stylus shaft gestures will now be described with reference to FIGS. 5A to 11B according to example embodiments.

Figure 5A:
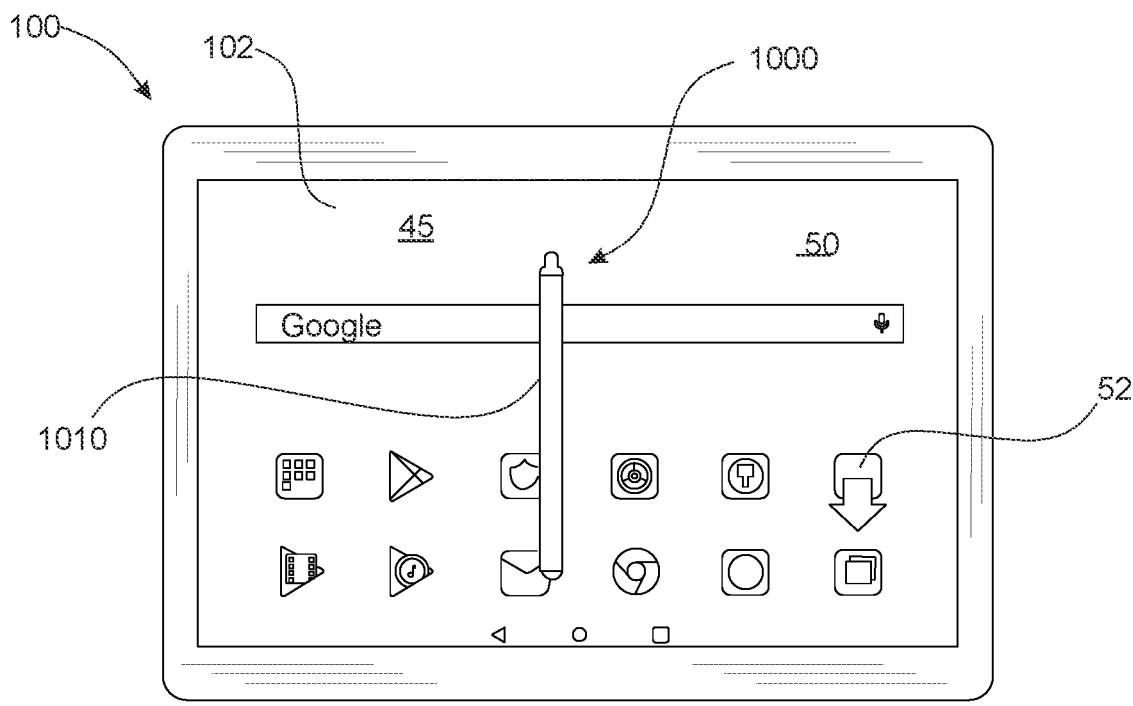
FIG. 5A shows an electronic device employing a touchscreen display, with the main viewing area of the touchscreen displaying a home screen user interface generated by an operating system.

FIG. 5A depicts example tablet-style electronic device 100 in a landscape orientation with touchscreen display 45 showing a home screen user interface 50 generated by UI module 116 on the main viewing area 102 thereof. A plurality of icons 52, each representing a respective application 120, are shown on the home screen user interface 50. Stylus 1000 is placed on the screen with its shaft 1010 in a generally vertical orientation. Touchscreen display system 110 operates as follows. The touch sensing system 112 senses the presence and location of the stylus shaft 1010 and provides corresponding signals to the touchscreen driver 114 which in turn generates corresponding spatial touch coordinate information that is processed by UI module 116. UI module 116 determines that the touch coordinate information corresponds to a vertical placement stylus shaft gesture within a center region of the home screen. In response, UI module 116 causes the display layout of the rendered information be altered as shown in FIG. 5B.

Figure 5B:
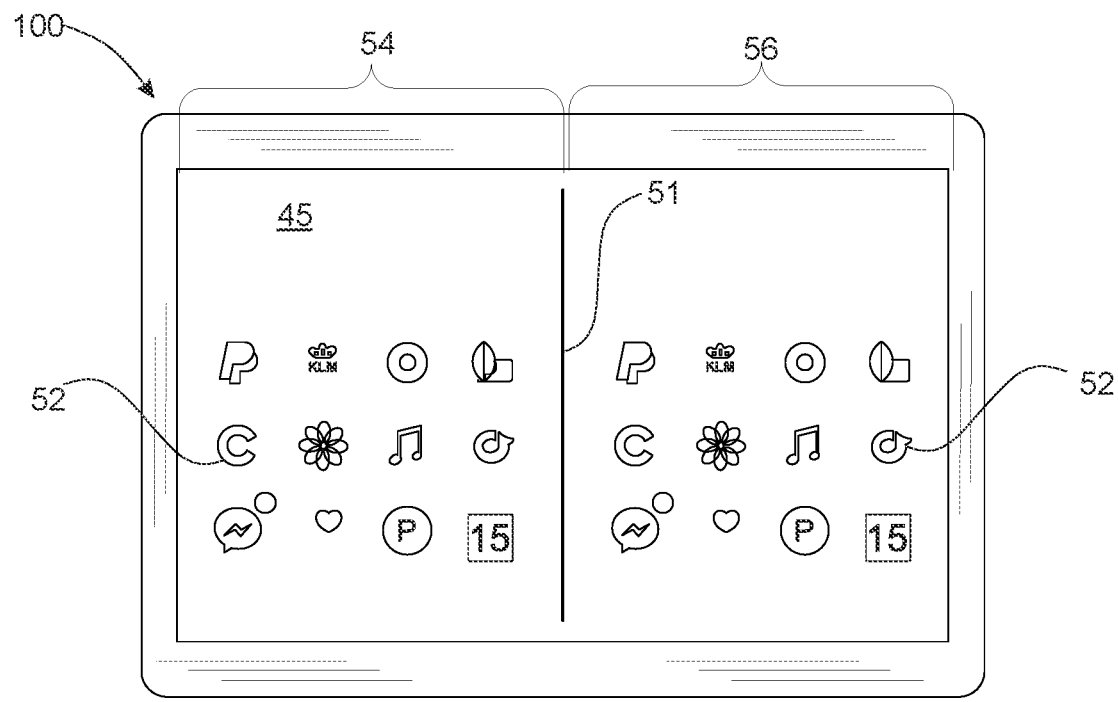
FIG. 5B shows the electronic device of FIG. 5A wherein the main viewing area of the touchscreen display has been split into a first and a second viewing area each displaying a user interface.

In FIG. 5B the main viewing area 102 of the touchscreen display 45 has been split vertically into a right viewing area 56 and a left viewing area 54 separated by the vertical separator 51 that is located at a border between right viewing area 56 and left viewing area 54. Vertical separator 51 is displayed approximately along the location of a line on which the shaft 1010 of the stylus 1000 touched the screen of the touchscreen display 45. In an example where no foreground or background applications were running on the electronic device 100 at the time the stylus 1000 engaged the screen of the touchscreen display 45, the right viewing area 56 and the left viewing area 54 each display a respective version of the home screen user interface, including a plurality of icons 52 each representing an application available for execution on the electronic device 100. A user may actuate one of the icons 52 using conventional touchscreen gestures in each of the right viewing area 56 and the left viewing area 54 to launch the corresponding application and cause the user interface thereof to be displayed in the respective viewing area. In the embodiment shown, the icons displayed in the right viewing area 56 and the left viewing area 54 are identical. Accordingly, the user may choose to launch different instances of the same application in both the right viewing area 56 and the left viewing area 54, or to launch different applications in each of the right viewing area 56 and the left viewing area 54.

In some examples, particularly if there are too many applications to fit all the icons thereof in a single viewing area, the icons displayed in the right viewing area 56 may be different from the icons displayed in the left viewing area 54. In some embodiments, each of the right viewing area 56 and left viewing area 54 may be independently scrollable windows that allow a user to scroll through and select the icons in each area using conventional touch gestures.

The transition from FIG. 5A to FIG. 5B illustrates use of stylus 1000 to activate a vertical split mode. In some examples, the stylus 1000 is placed on the screen with its shaft 1010 in a generally horizontal orientation, as shown earlier in FIG. 4B. In this case, a horizontal split mode is activated and the main viewing area of the touchscreen display 45 is split horizontally along the line where the stylus is placed approximately. The touchscreen display 45 then shows a top viewing area and a bottom viewing area, which can each function in the same manner as left and right viewing areas 54, 56, respectively, as described above In the example described above in respect of FIG. 5A and FIG. 5B, in which no background applications are running, the user must manually select an application's icon 52 in one of the viewing areas 54, 56 to launch the application and have content associated with that application displayed in the respective viewing area 54, 56.

In some examples, detection of a vertical stylus shaft placement gesture or horizontal stylus shaft placement gesture on a home screen user interface 50 by the touchscreen display system 110 can result in content from a default application automatically being displayed in one of the resulting respective viewing areas 54, 56 without further user interaction. Is some examples, the default application could be automatically launched if it is not currently running in the background.

The default application may for example be a commonly used application such as a note-taking application, a clock application, a calendar application, or any other application. In some examples, the UI module 116 can be configured by a user to set the default application to a user specified application.

Figure 6A:
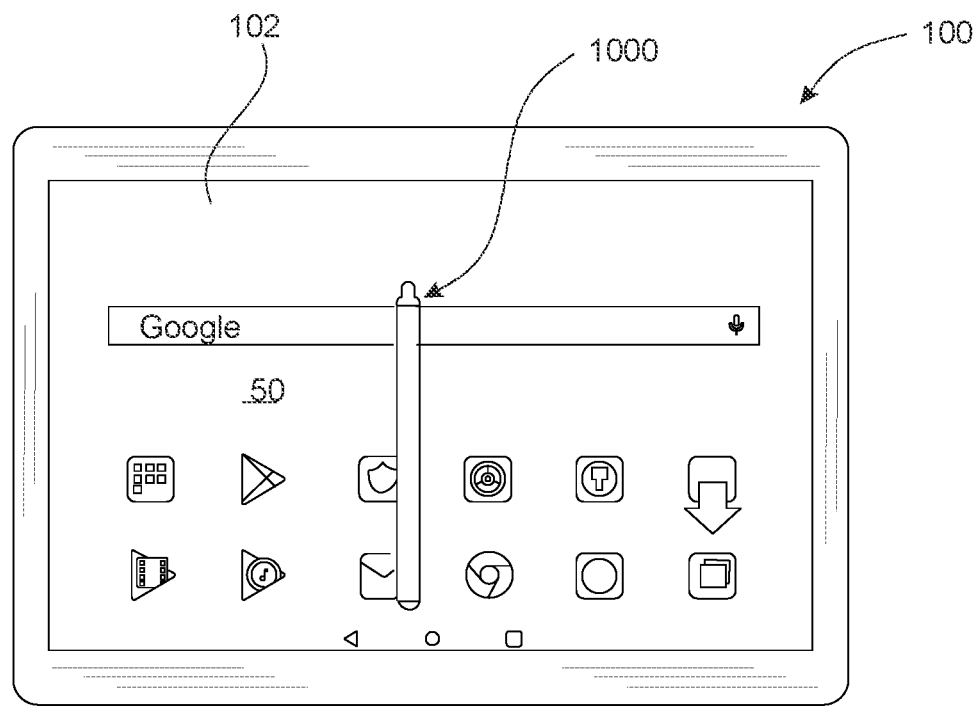
FIG. 6A shows an electronic device with a main viewing area of the touchscreen displaying a home screen user interface, with one application running in the background on the electronic device, and a stylus being placed on the screen of the touchscreen display.
Figure 6B:
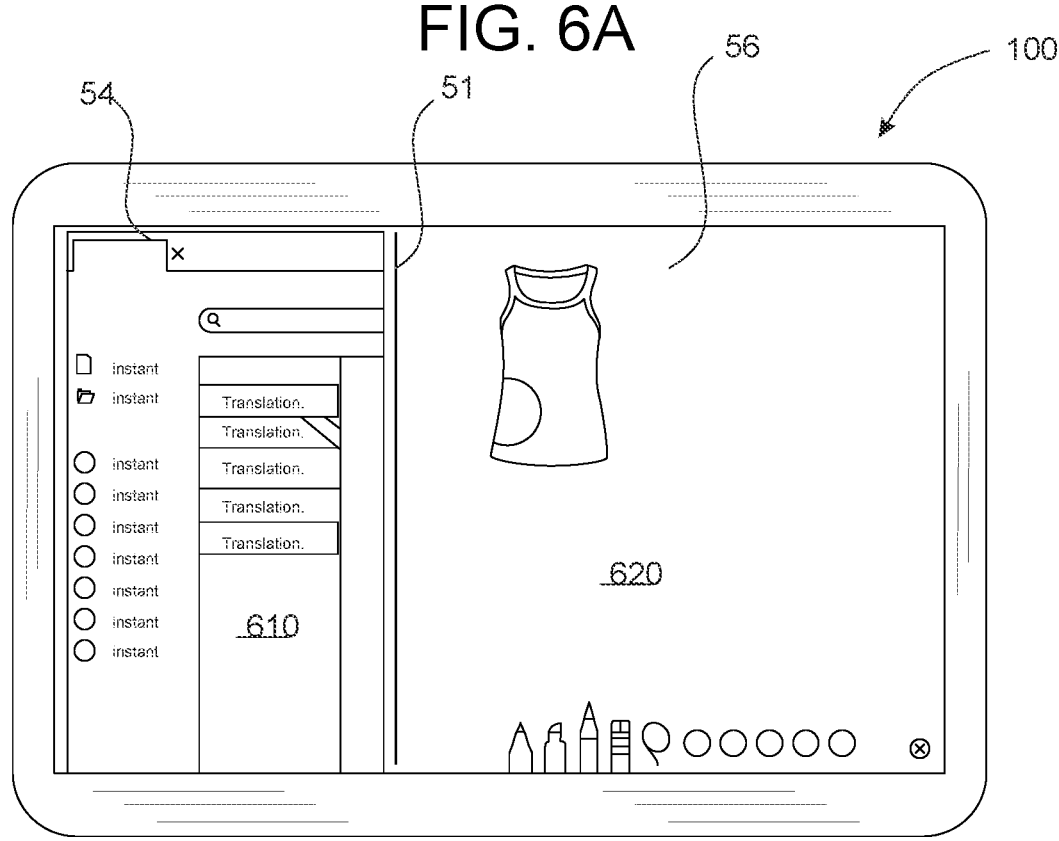
FIG. 6B shows the electronic device of FIG. 6A or 6B wherein the main viewing area of the touchscreen display has been split into a first and a second viewing areas, wherein the first viewing area displays the user interface of a running application and the second viewing area displays the user interface of a note-taking application, in accordance with embodiments of the present disclosure.

In some examples where one or more background application running on the electronic device 100 at the time the main viewing area 102 of the touchscreen display 45 is split, one or more of the viewing areas may automatically display content from a respective one of the background applications. Thus, detection of a stylus shaft placement gesture on a home screen user interface 50 by the touchscreen display system 110 can cause the UI module 116 to transition a background application to a foreground application with content from that application automatically being displayed in one of the resulting respective viewing areas 54, 56. Such an example is shown in FIG. 6A and FIG. 6B. In FIG. 6A, the electronic device 100 shows a home screen user interface 50 on the main viewing area 102 of the touchscreen display 45. A first application is running in the background on the electronic device 100. A stylus 1000 is placed in a generally vertical orientation on the screen near the center of the main viewing area 102 of the touchscreen display 45. In response to detecting a vertical stylus shaft placement gesture, UI module 116 causes the main viewing area 102 to be split into a right viewing area 56 and a left viewing 54, separated by a separator 51 as shown in FIG. 6B. With reference to FIG. 6B, the left viewing area 54 displays a user interface 610 of the first application which was running in the background at the time the stylus 1000 was placed on the screen. The right viewing area 56 displays the user interface 620 of a default application. In the example shown, the default application is a note-taking application.

Figure 6C:
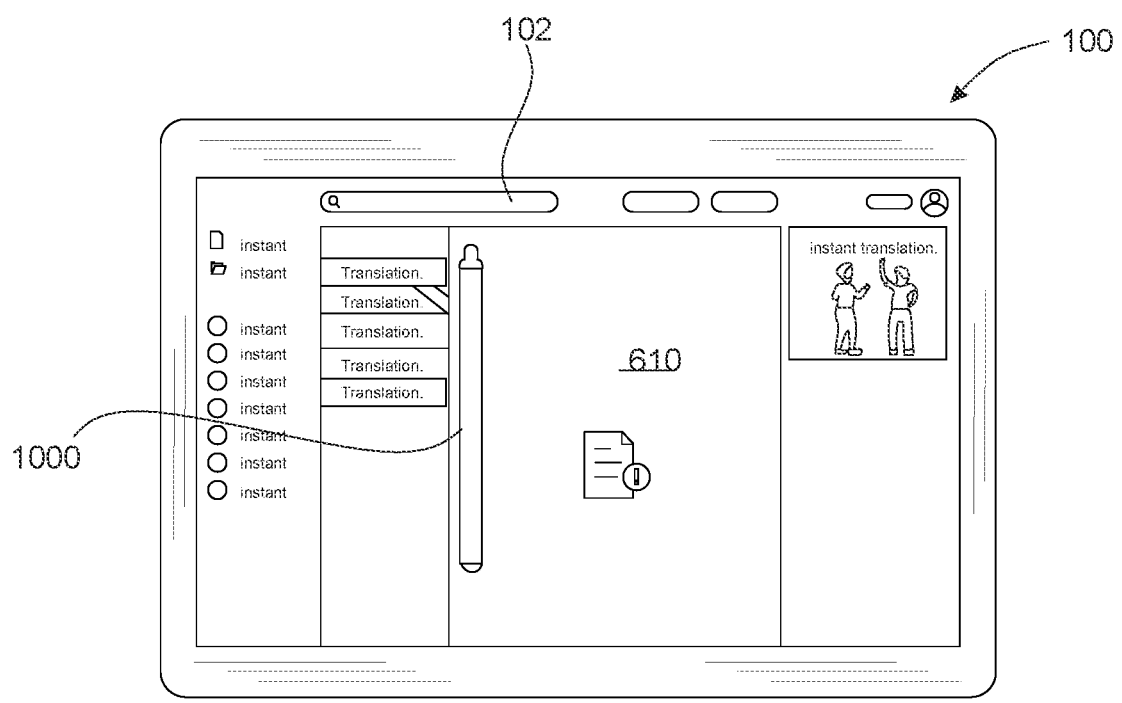
FIG. 6C shows an electronic device with a main viewing area of the touchscreen displaying a user interface of a foreground application running on the electronic device, and a stylus being placed on the screen of the touchscreen display.

In another example, as shown in FIG. 6C, the electronic device 100 shows on its main viewing area 102 the user interface 610 of a first application running in the foreground on the electronic device 100. When the stylus 1000 is placed on the screen in a generally vertical orientation, UI module 116 causes the main viewing area 102 to split into a right viewing area 56 and a left viewing area 54 as described above with respect to FIG. 6B. The left viewing area 54 displays the user interface 610 of the first application and the right viewing area 56 displays the user interface 620 of the default application In some examples, when the stylus is placed on the screen as described above with respect to FIG. 6A, the main viewing area 102 is not split into sub-areas. Rather, the UI module 116 causes the home screen user interface 50 to be replaced with content from an application that fills the entire main viewing area 102. For example, depending on a device configuration the home screen user interface 50 could be replaced with the user interface content of either a default application or a background application.

Figure 6D:
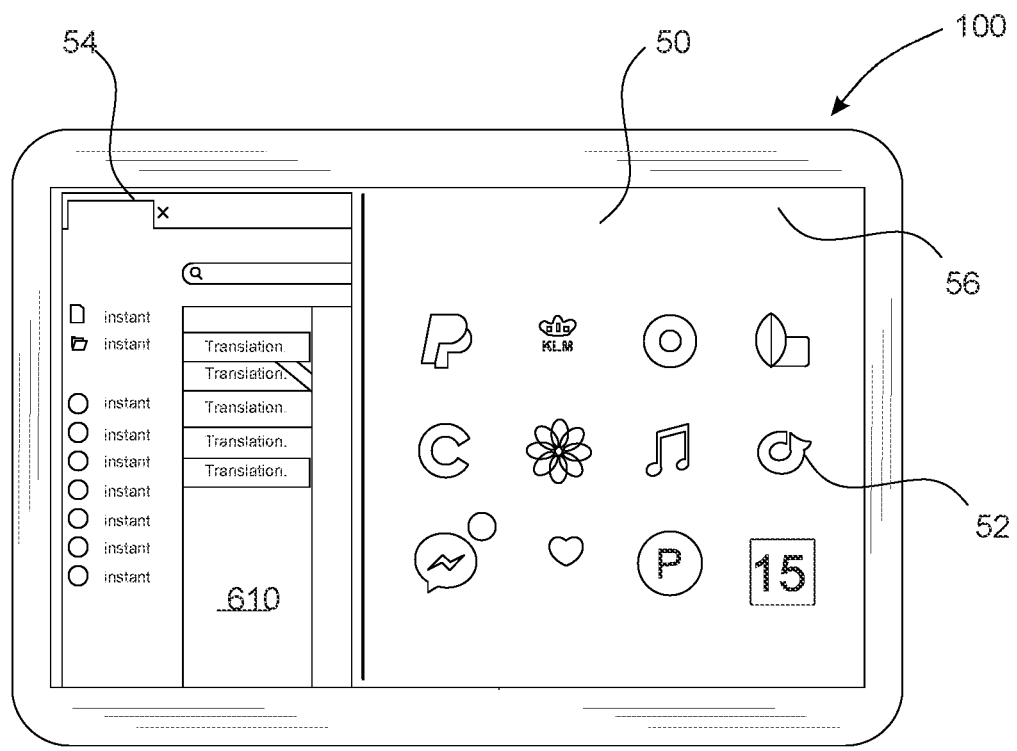
FIG. 6D shows the electronic device of FIG. 6A or 6C wherein the main viewing area of the touchscreen display has been split into a first and a second viewing areas, wherein the first viewing area displays the user interface of the running application and the second viewing area displays a user interface comprising plurality of icons representing applications in the second viewing area.
Figure 6E:
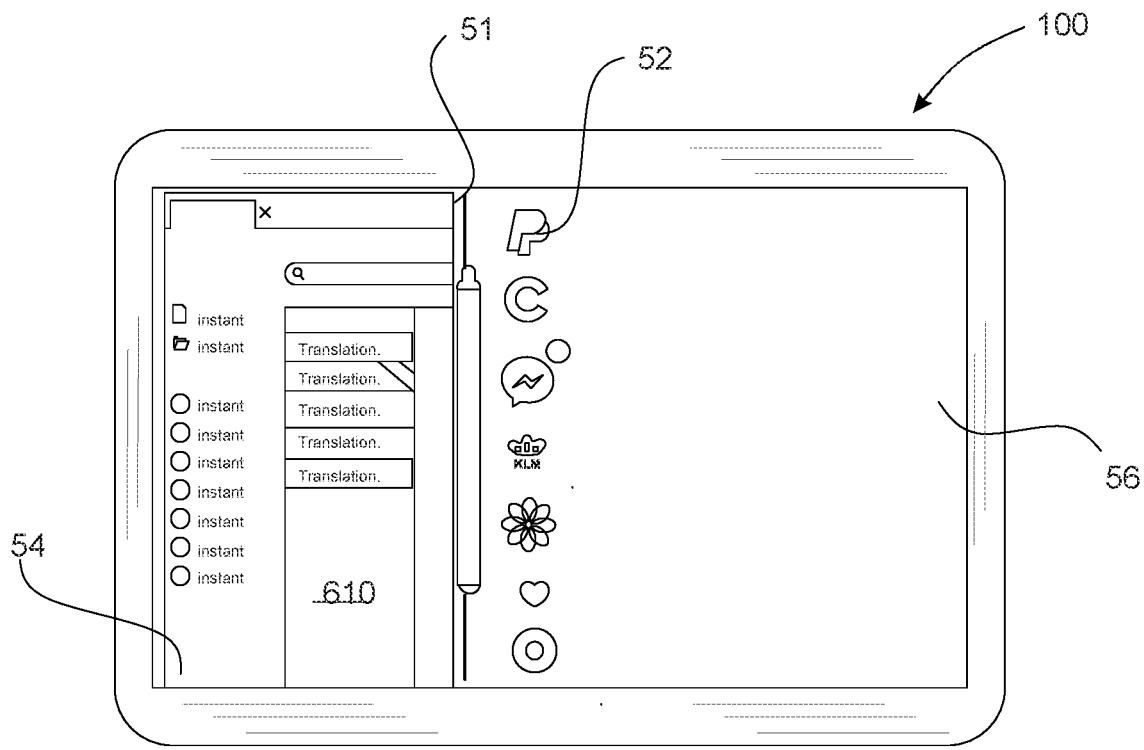
FIG. 6E shows an alternate arrangement of the plurality of icons of FIG. 6D, wherein the plurality of icons are arranged adjacent the separator between the first and second viewing areas.

In a further example, a hybrid method for determining the content of newly created viewing areas is shown in FIGS. 6D and 6E, which illustrate a touchscreen display after the main viewing area 102 is split into a left viewing area 54 and a right viewing area 56 in response to detection of a vertical placement shaft gesture. Instead of running a default application in the right viewing area 56, a home screen user interface 50 comprising a plurality of icons 52 representing a plurality of applications are displayed in the right viewing area 56. The user may activate any of the icons 52 to start a corresponding application such that the user interface of the corresponding application is displayed in the right viewing area 56. FIG. 6D shows a first display layout of the icons 52 in the right viewing area 56 in which the icons 52 are evenly arranged across the whole right viewing area 56. FIG. 6E shows a second display layout of the icons 52 in the right viewing area 56 in which the icons 52 are aligned along the separator 51.

In some embodiments, the split mode of the touchscreen display may be switched from vertical split mode to horizontal split mode by using the stylus 1000. For example, a touchscreen display which has been split into a right viewing area 56 and a left viewing area 54 is in a vertical split mode. The touchscreen display may be switched to a horizontal split mode in which it is split into a top viewing area and a bottom viewing area, and vice versa. The UI module 116 may have a default configuration which determines the contents of the new viewing areas in relation with the contents of the old viewing areas. For example, the UI module 116 may be configured to display the contents of the left viewing area in a vertical split mode, into a top viewing area when the viewing area is switched to a horizontal split mode. Similarly, the contents of the right viewing area in the vertical split mode, may be displayed in the bottom viewing area in the horizontal split mode.

Figure 7A:
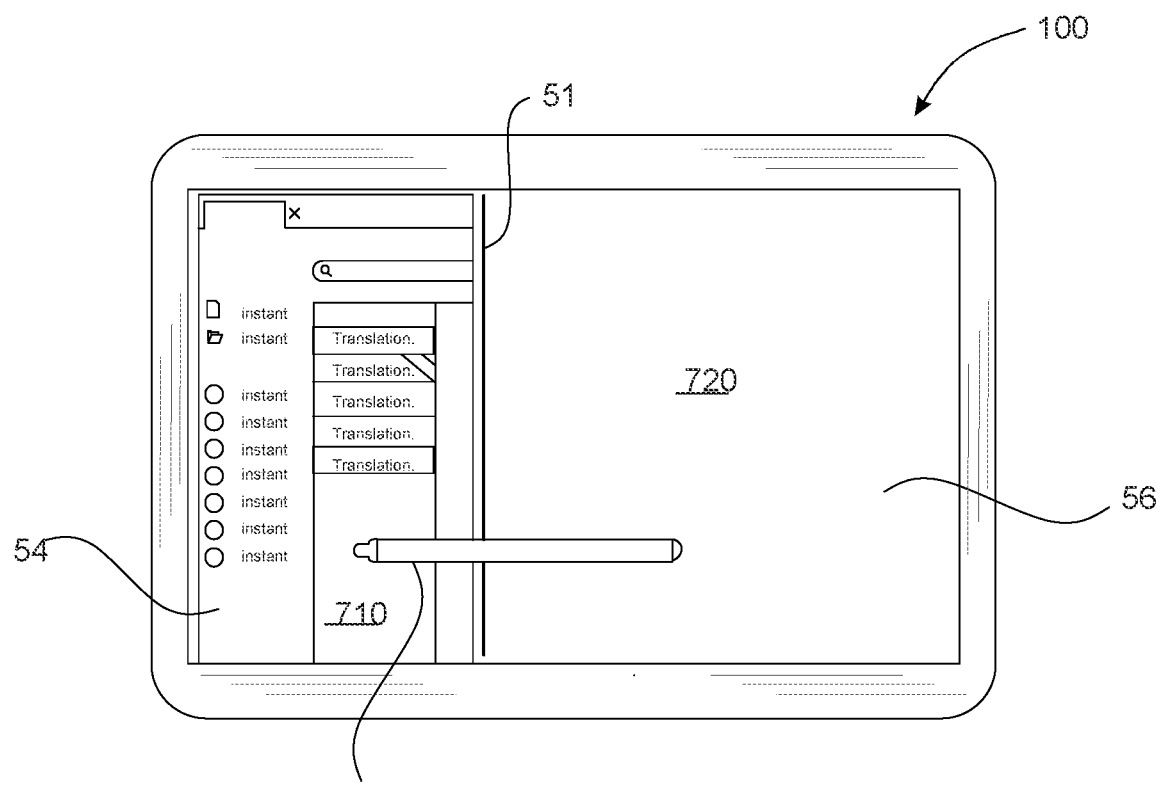
FIG. 7A shows an electronic device having a touchscreen display wherein the main viewing area thereof has been split into a right viewing area and a left viewing area separated by a vertical separator, each of the right and left viewing area displaying user interface content, wherein a stylus has been placed generally horizontally on the screen of the touchscreen display.
Figure 7B:
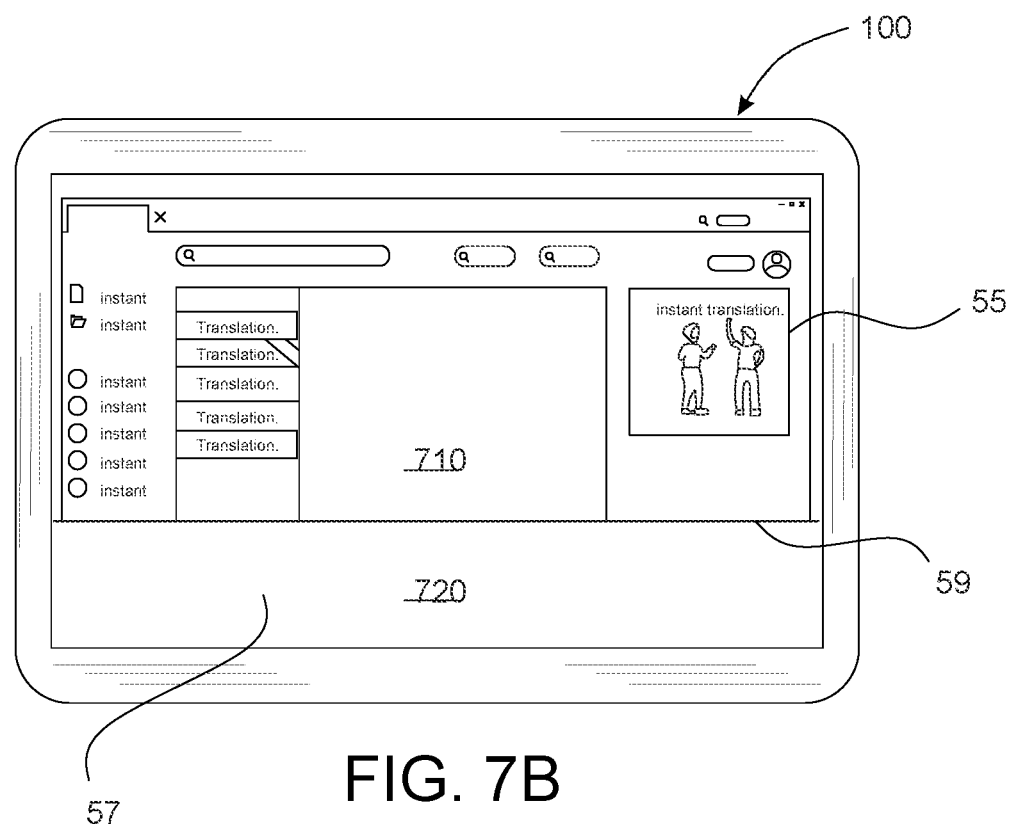
FIG. 7B shows the electronic device of FIG. 7A wherein the main viewing area of the touchscreen display is split into a top viewing area showing the user interface content of the left viewing area of FIG. 7A, and a bottom viewing area showing the user interface content of the right viewing area of FIG. 7A.

In this regard, FIG. 7A, shows an electronic device 100 with the touchscreen display 45 in a vertical split mode. The main viewing area 102 has been split into a left viewing area 54 showing a first user interface 710 of a first application, and a right viewing area 56 showing a second user interface 720. A stylus 1000 is placed generally horizontally on the screen of the touchscreen display 45. In response to detecting a horizontal stylus shaft placement gesture, the user interface module 116 switches the touchscreen display 45 from a vertical split mode to a horizontal split mode shown in FIG. 7B. With reference to FIG. 7B, the main viewing area is comprised of a top viewing area 55 and a bottom viewing area 57 separated by a horizontal separator 59 at the approximate location at which the stylus 1000 engaged the screen of the touchscreen display 45. The user interface of the first application is resized and shown as user interface 710 in the top viewing area 55. Similarly, the bottom viewing area 57 shows the user interface 720 of what was in the right viewing area before the stylus 1000 was placed on the screen of the touchscreen display 45.

In another example, the stylus shaft 1010 may be placed generally vertically on the screen of a touchscreen display 45 that is in horizontal split mode with the main viewing area 102 is split into a top viewing area 55 and a bottom viewing area 57. In this case, the opposite of what is described above with reference to FIGS. 7A and 7B takes place. Specifically, the touchscreen display 45 switches from a horizontal split mode to a vertical split mode in which the main viewing area is split into a left viewing area 54 and a right viewing area 56. The left viewing area 54 displays the content that was displayed in the top viewing area 55 before the stylus was placed vertically on the screen, the contents being resized to fit in the left viewing area 54. Similarly, the right viewing area 56 displays the content that was displayed in the bottom viewing area 57 before the stylus 1000 was placed horizontally on the screen, the contents being resized to fit in the right viewing area 56.

In some examples where two applications may be running in the background on the electronic device 100, before the main viewing area of the touchscreen display 45 is split, and the UI module 116 is configured to cause each of the background applications to be brought into the foreground and their respective user interfaces to be displayed in a respective one of the two viewing areas 54, 56 (in vertical split mode) or viewing areas 55, 57 (in horizontal split mode). In various examples and configurations, the content of each of the newly created viewing areas after the main viewing area is split may be decided by the UI module 116 based on predetermined parameters, at least some of which may be user configured.

Figure 8A:
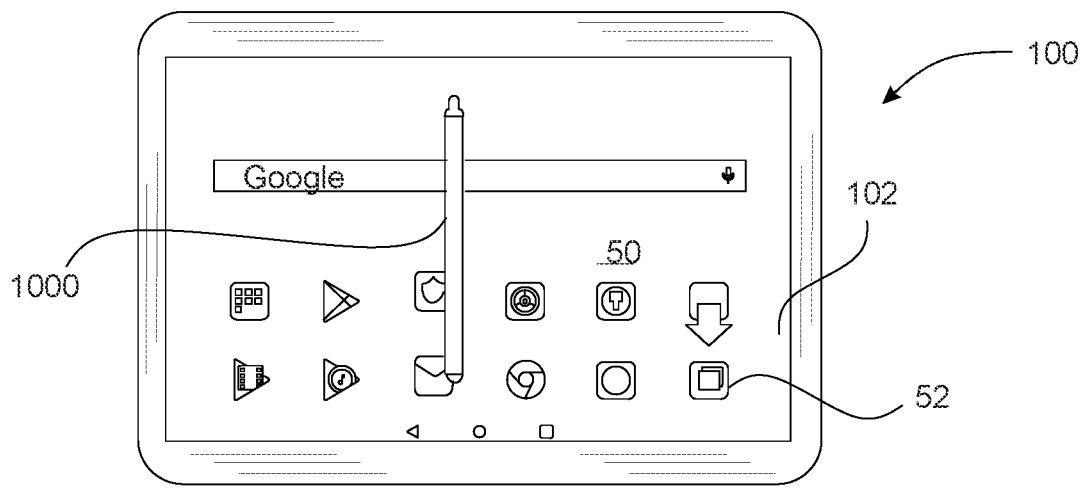
FIG. 8A shows the electronic device with a main viewing area of the touchscreen displaying a home screen user interface, with first and second applications running in the background on the electronic device, and a stylus being placed on the screen of the touchscreen display.

In one example, shown in FIG. 8A, a first application and a second application of applications 120 are running in background mode on the electronic device 100. The main viewing area 102 of the touchscreen display 45 of the electronic device 100 shows a home screen user interface 50 including a plurality of icons 52. A stylus 1000 is placed generally vertically on the screen of the touchscreen display. In example configuration shown in FIG. 8D, in response to detecting the vertical stylus shaft placement gesture, UI module 116 causes the main viewing area 102 to be split into a right viewing area 56 showing the user interface 820 of the first application and a left viewing area 54 showing the user interface 810 of the second application. Accordingly, both background applications become foreground applications and are displayed in the respective left and right viewing areas 54, 56.

Figure 8B:
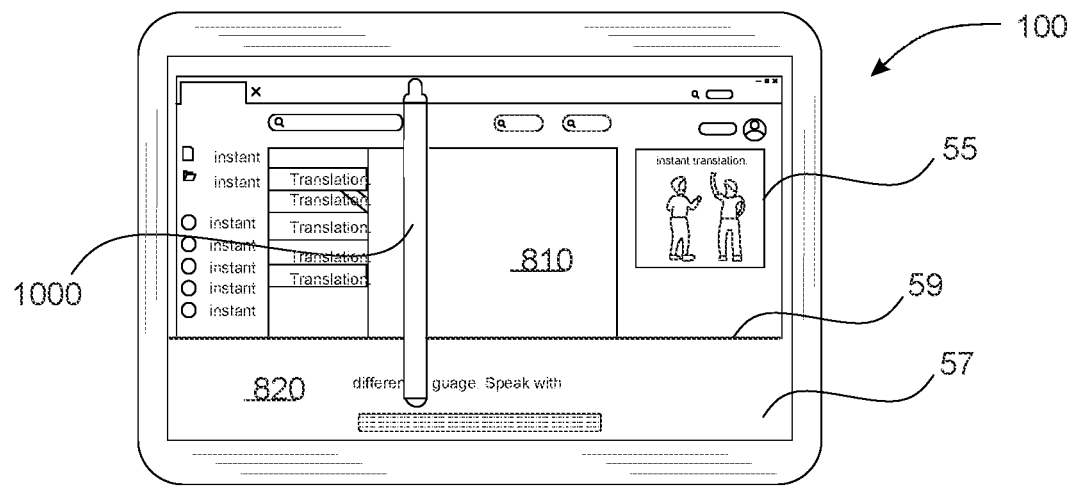
FIG. 8B shows the electronic device wherein the main viewing area of the touchscreen display is split into a top viewing area and a bottom viewing area separated by a horizontal separator, the top viewing area displaying the user interface of a first foreground application and the bottom viewing area displaying the user interface of a second foreground application, and a stylus being placed on the screen of the touchscreen display.

In another example configuration, shown in FIG. 8B, there are two foreground applications 120 running on the electronic device 10. The first application has a user interface 810 displayed in the top viewing area 55, while the second application has a user interface 820 displayed in the bottom viewing area 57. The top and bottom viewing areas 55, 57 are separated by a separator 59. The stylus 1000 is placed generally vertically on the screen of the touchscreen display of the electronic device 100. In response to detecting a vertically oriented stylus shaft placement gesture, UI module 116 of the electronic device 100 causes the main viewing area 102 of the touchscreen display 45 to be switched from horizontal split mode to a vertical split mode, including a right viewing area 56 and a left viewing area 54, as shown in FIG. 8D. The first application user interface 810 which was previously displayed in the top viewing area 55 is displayed in the left viewing area 54. The second application user interface 820 which was previously displayed in the bottom viewing area 57, is displayed in the right viewing area 54.

Figure 8C:
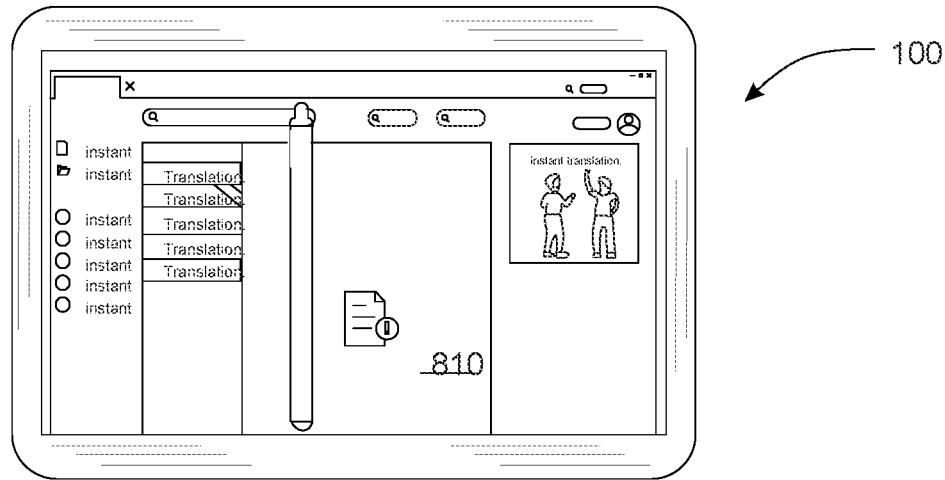
FIG. 8C shows the electronic device having a touchscreen display wherein the main viewing area displays a user interface of a first foreground application running on the electronic device, wherein a second background application is also running on the electronic device, and wherein a stylus is placed on the screen of the touchscreen display.
Figure 8D:
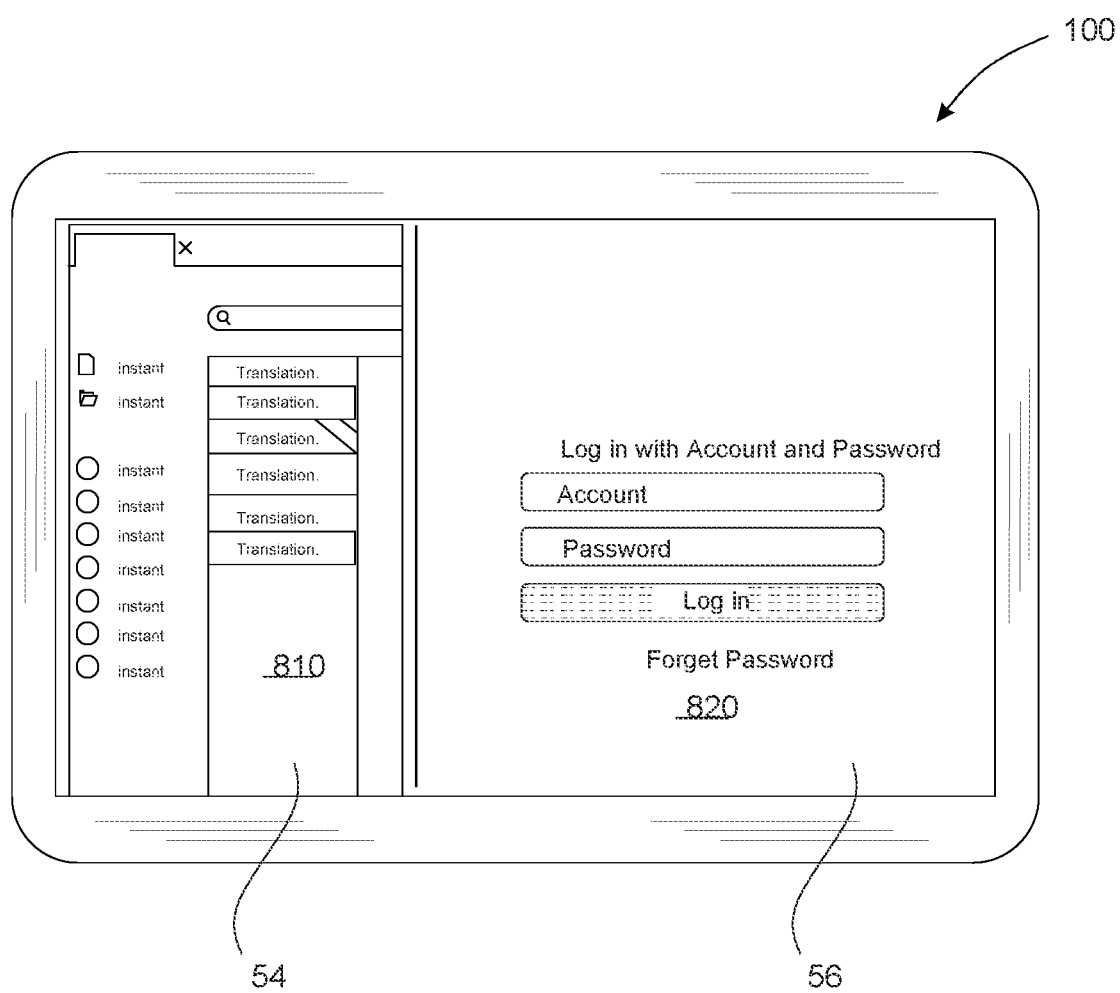
FIG. 8D shows the electronic device wherein the main viewing area has been split into a right viewing area and a left viewing area separated by a vertical separator, the right viewing area displaying the user interface of a first application and the left viewing area displaying the user interface of a second application.

In yet another example configuration, shown in FIG. 8C, there is a first application running in the foreground on the electronic device 100. The first application has a user interface 810 displayed on the main viewing area 102 of the touchscreen display 45 of the electronic device 100. Additionally, there is a second application running in the background on the electronic device 10. The stylus 1000 is placed generally vertically on the screen of the touchscreen display of the electronic device 100. In response to detecting a vertically oriented stylus shaft placement gesture, UI module 116 causes the main viewing area 102 of the touchscreen display 45 to be split into a right viewing area 54 and a left viewing area 56 as shown in FIG. 8D. The user interface 810 of the first application is displayed in the left viewing area 56. The user interface 820 of the second application is displayed in the right viewing area 54. In this case, the second application is switched from a background mode to foreground mode in response to splitting the main viewing area 102 into a right viewing area 54 and a left viewing area 56.

In a further example that is similar to the examples shown in FIGS. 8A-8C, the placement of the stylus 1000 may be in a generally horizontal orientation on the screen of the touchscreen display of the electronic device 100. In response to the generally horizontal placement of the stylus 1000, the first application is displayed in a top viewing area while the second application is displayed in a bottom viewing area.

In some examples, three or more applications may be running on the electronic device. In such cases, UI module 116 may provide, in different configurations, a number of options for determining the content of newly created viewing areas in response to detecting a vertically or horizontally oriented stylus shaft placement gesture.

Figure 9A:
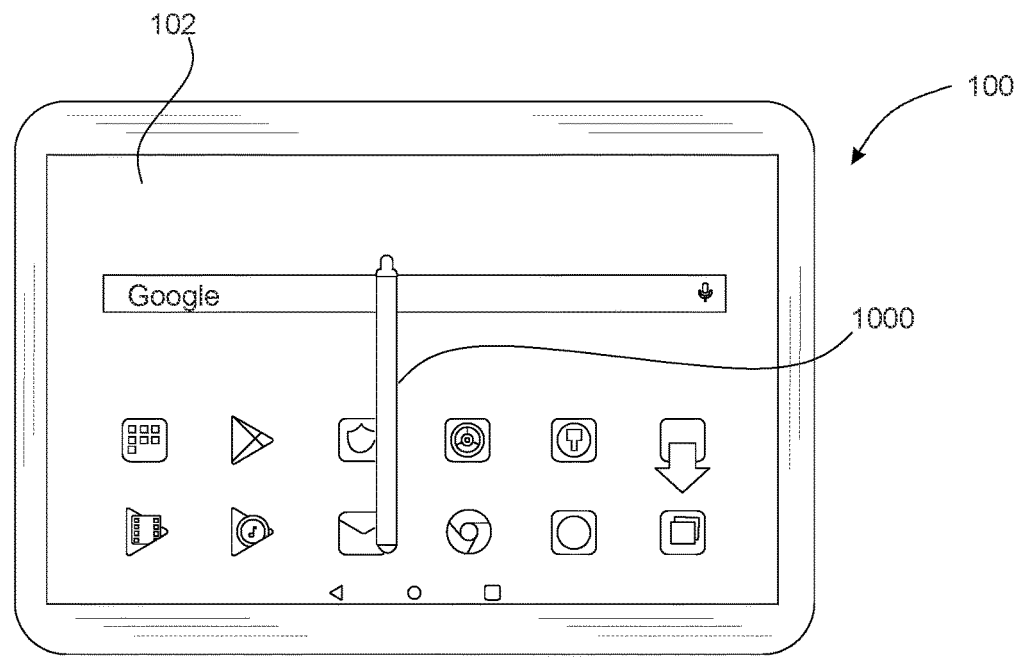
FIG. 9A shows the electronic device with the main viewing area of the touchscreen displaying a home screen user interface, with three applications running in the background on the electronic device, and a stylus being placed on the screen of the touchscreen display.
Figure 9B:
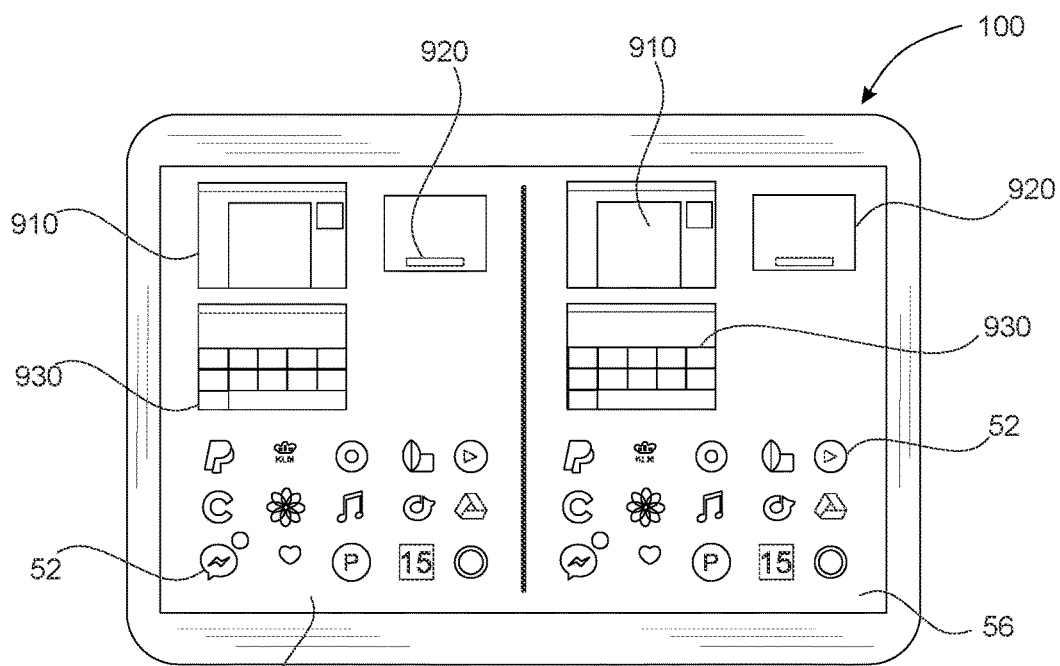
FIG. 9B shows the electronic device wherein the main viewing area thereof has been split into a right viewing area and a left viewing area separated by a vertical separator, each of the right and left viewing areas displaying a screen shot of each of the three applications and a plurality of icons for other applications available to run on the electronic device, in accordance with embodiments of the present disclosure.

For example, with reference to FIG. 9A, there is shown a main viewing area 102 of the touchscreen display 45 of an electronic device 100. The main viewing area 102 shows a home screen user interface 50 containing a plurality of icons 52 as described earlier. First, second and third background applications 120 are running on the electronic device 100. A stylus 1000 is placed on the screen of the touchscreen display of the electronic device 100 in a generally vertical orientation. In response to the placement of the stylus 1000, the touchscreen display system 110 causes the main viewing area 102 of the touchscreen display to be split into a right viewing area 56 and a left viewing area 54 along the line of contact of the stylus 1000 with the screen. The contents of the left viewing area 54 and the right viewing 56 area are shown in FIG. 9B. In each of the left viewing area 54 and the right viewing area 56, a screenshot 910 of the user interface of the first background application is displayed. Similarly, a screenshot 920 of the user interface of the second background application is displayed in each of the left and right viewing areas. Furthermore, a screenshot 930 of the user interface of the third background application is displayed in each of the left and right viewing areas. The three screenshots 910, 920 and 930 are reduced in size for fitting in each of the viewing areas. Additionally, the three screenshots do not occupy the entire space of the left and right viewing areas. The space of the left and right viewing areas 54, 56 which is not occupied by the screenshots 910, 920 and 930 of the applications is used to display a plurality of icons 52 representing other applications which are available for execution but which are not currently running.

Figure 9C:
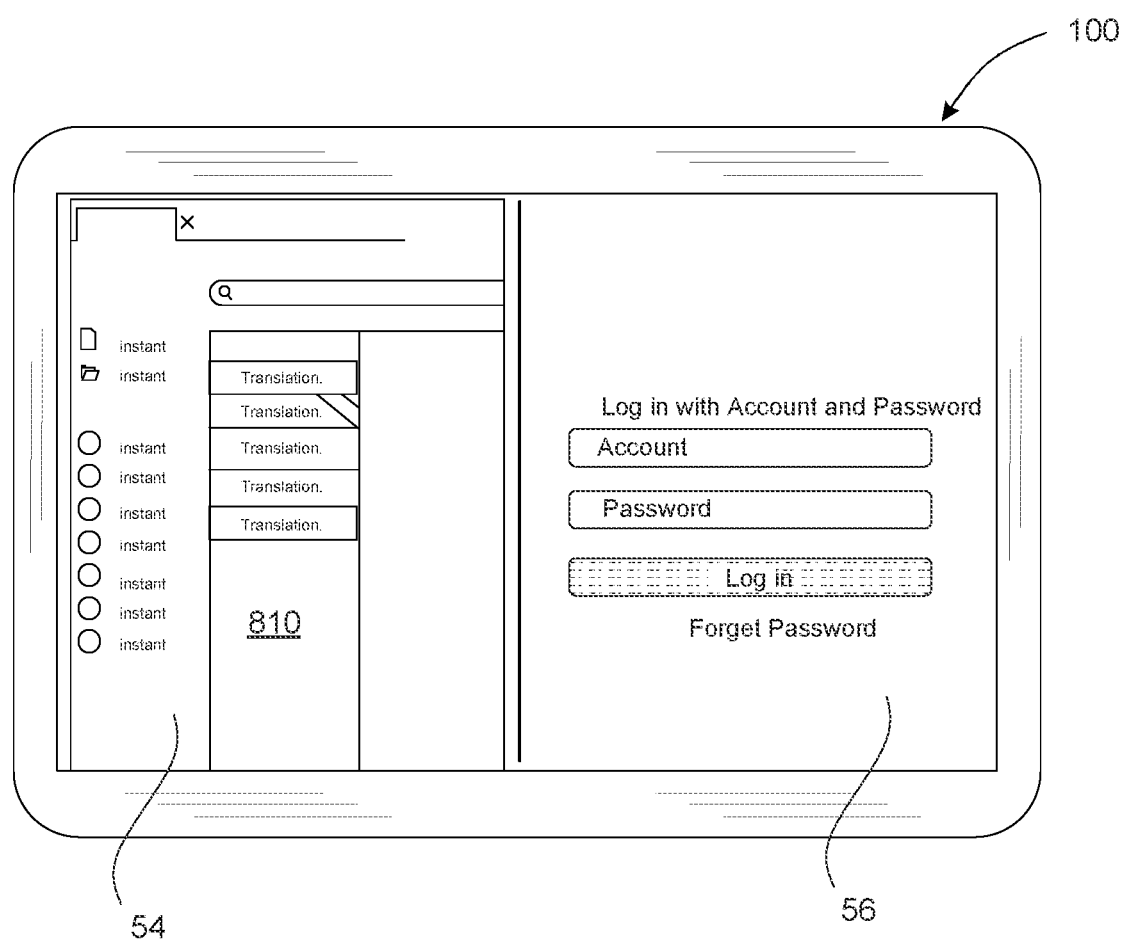
FIG. 9C shows the electronic device of FIG. 9A wherein the screen shot of a first application in FIG. 9B has been selected to actuate first application and the first application's user interface is displayed in the left viewing area, and wherein the screen shot of the second application in FIG. 9B has been actuated and the second application's user interface is displayed in the right viewing area.
Figure 9D:
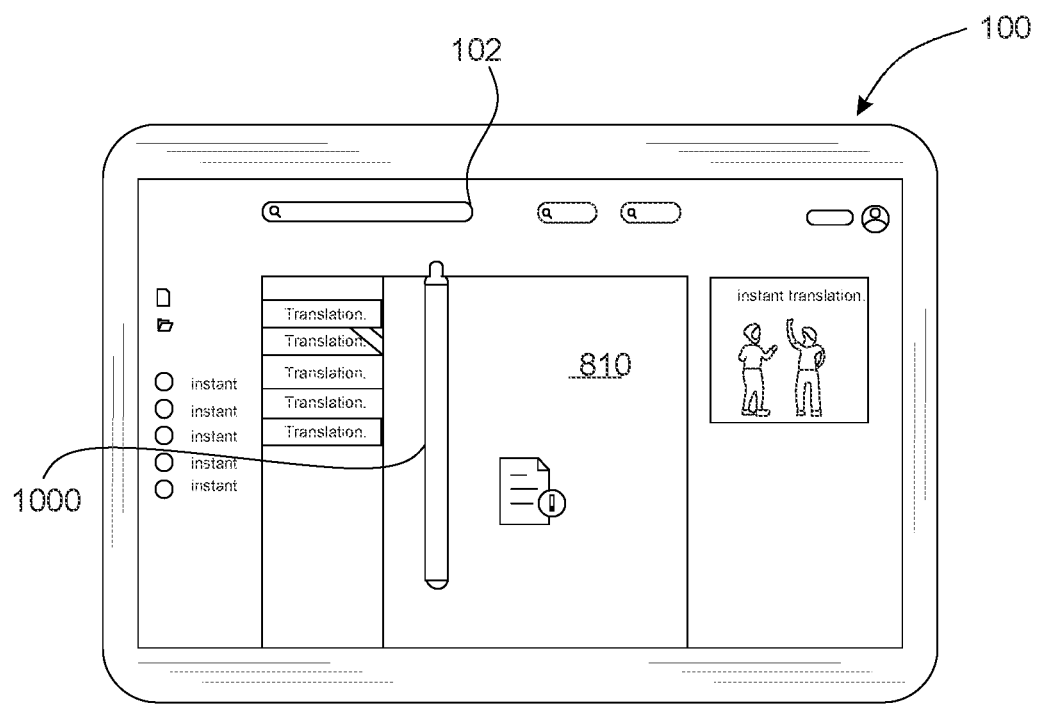
FIG. 9D shows the electronic device with the main viewing area of the touchscreen displaying the user interface of a first foreground application running on the electronic device, with two background applications running in the background on the electronic device, and a stylus being placed on the screen of the touchscreen display.

In one embodiment shown in FIG. 9C, the screenshots 910, 920 and 930 are active user interface elements that can be actuated by a user. The screenshots may be actuated using conventional touch gestures such as a single tap, a double tap, or a swipe. Actuating the screenshot of the user interface of an application causes that application to occupy the corresponding viewing area in which the actuating takes place. For example, actuating the screenshot 910 in the left viewing area of FIG. 9B causes the user interface 810 of the first application to be displayed in the left viewing area 56 of the touchscreen display, as shown in FIG. 9C. Similarly, actuating the screenshot 920 in the right viewing area 54 of FIG. 9B causes the user interface 820 of the second application to be displayed in the right viewing area 56 of the touchscreen display, as shown in FIG. 9C. In one embodiment (not shown), actuating an icon 52 in a viewing area causes the corresponding application to start execution and display the user interface of that application to be displayed in that viewing area. Background applications having a viewing area that does not get actuated remain running in the background.

Figure 9E:
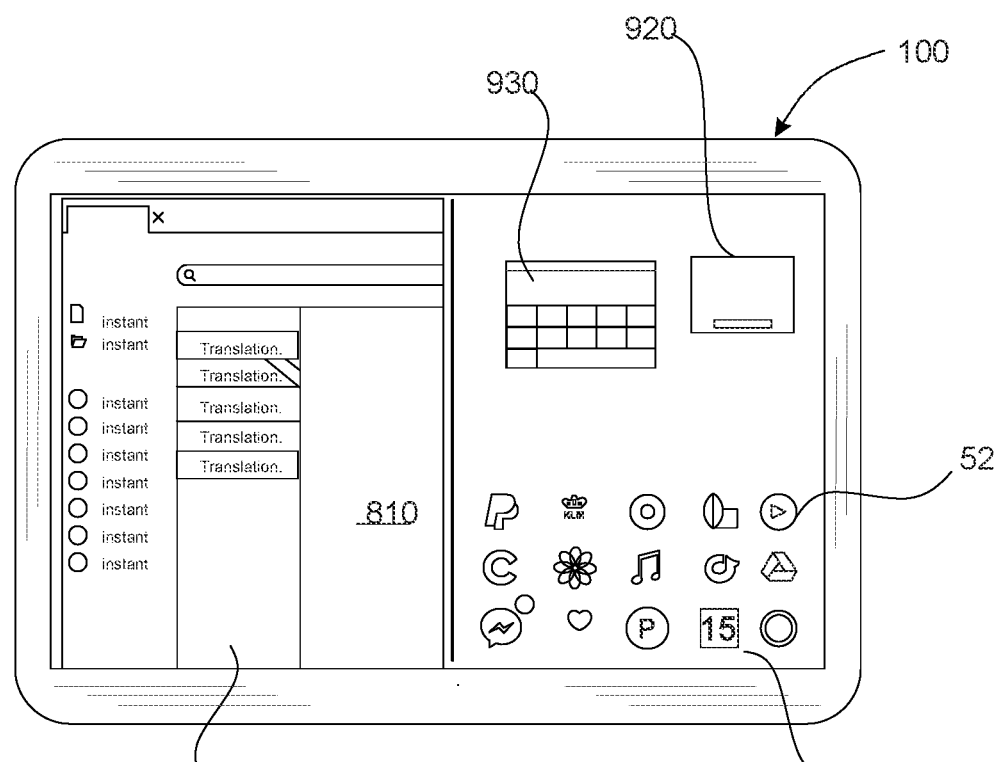
FIG. 9E shows the electronic device of FIG. 9D wherein the main viewing area thereof has been split into a right viewing area and a left viewing area separated by a vertical separator, the left viewing area displaying the user interface of the first foreground application, the right viewing displaying a screen shot of each of the two background applications and a plurality of icons for other applications available to run on the electronic device.

In one embodiment, three or more applications are running on an electronic device 100 with one of them being a foreground application while the rest are background applications. For example, with reference to FIG. 9D, a first application is running in the foreground, a second application is running in the background, and third application is also running in the background on the electronic device 100. The first application has a user interface 810 displayed on the main viewing area of the touchscreen display of the electronic device 100. A stylus 1000 is placed on the screen of the touchscreen display in a generally vertical orientation as described earlier. In response to detecting the stylus placement, the touchscreen display system 110 splits the main viewing area into a left viewing area 54 and a right viewing area 56, as shown in FIG. 9E. In the left viewing area 54, the user interface 810 of the first (foreground) application is resized and displayed. In the right viewing area, screenshots 920 and 930 of the user interfaces of the second (background) and third (background) applications are shown. As described earlier, the screenshots 920 and 930 may be active user interface elements which when actuated launch the corresponding application and displays that application's user interface in the right viewing area. For example, actuating the screenshot 920 in the right viewing area of FIG. 9E will display the user interface of the second (background) application in the right viewing area, as shown in FIG. 9C. The right viewing area 54 of FIG. 9E also includes a plurality of icons 52 for applications which are not running on the electronic device 100. In one embodiment (not shown), actuating an icon 52 launches the corresponding application and displays that application's user interface in the right viewing area.

Figure 10A:
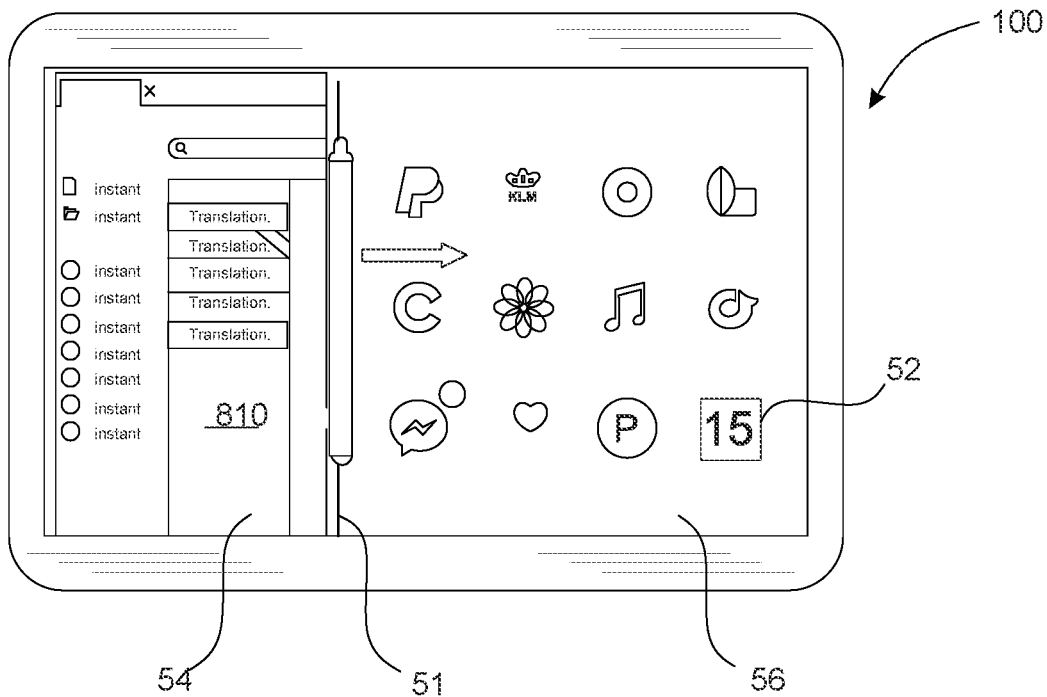
FIG. 10A shows the electronic device wherein the main viewing area of the touchscreen display has been split into first and second viewing areas separated by a separator, wherein the first viewing area displays the user interface of the running application and the second viewing area displays a plurality of icons representing applications available to run and display the user interface thereof in the second viewing area, and wherein a stylus is placed on the screen of the touchscreen display on the separator and dragged horizontally across the screen to a new position.
Figure 10B:
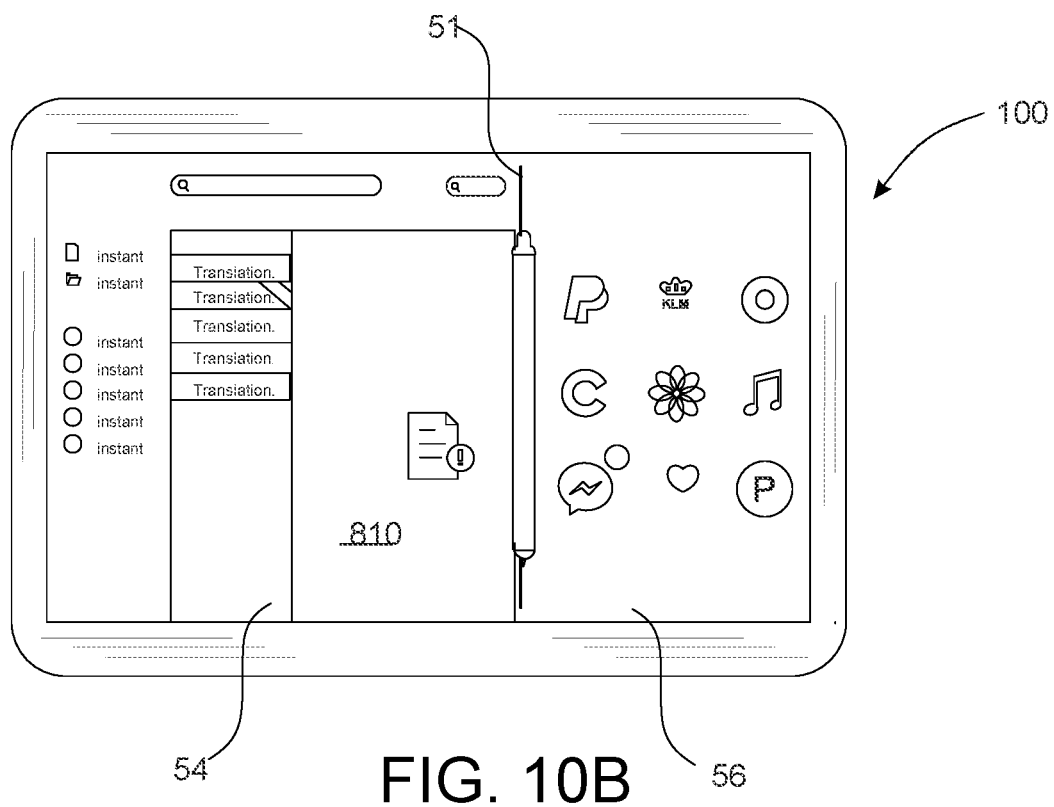
FIG. 10B shows the electronic device of FIG. 10A wherein the stylus is at the new position, and the separator has been moved to the new position, thus making the left viewing area larger and the right viewing area smaller.

In a further aspect of the present disclosure there is provided a method of resizing the viewing areas of a touchscreen display 45 of an electronic device 100. With reference to FIG. 10A, an electronic device 100 has a touchscreen display 45 divided into a right viewing area 56 and a left viewing area 54. In the right viewing area 56, a plurality of icons 52 are displayed. In the left viewing area 54, the user interface 810 of a foreground application is displayed. A stylus 1000 is placed on the screen of the touchscreen display at the separator 51 separating the right viewing area 56 from the left viewing area 54. Touchscreen display system 110 determines that a vertical stylus shaft placement gesture has occurred in a location that coincides with the separator 51. The UI module 116 causes the position of the separator 51 to be temporarily locked to that of the stylus 1000 while the stylus remains vertically oriented on the screen. Sliding or dragging of the stylus 1000 in either direction generally perpendicular to an axis of the separator 51 (e.g., left or right) is detected by the UI module 116 and recognized as a stylus shaft dragging gesture. In response to detecting the stylus shaft dragging gesture, UI module 116 causes the display layout to change such that the right or left motion of the stylus shaft 1010 is tracked by the separator 51 as long as the stylus 1000 maintains touch contact with the screen of the touchscreen display. In the shown embodiment, the stylus shaft 1010 is slid towards the right while maintaining touch contact with the screen. As a result, as shown in FIG. 10B, the separator 51 between the right viewing area 56 and the left viewing area 54 is moved along with the stylus 1000 towards the right. When the stylus 1000 is lifted off the screen, the UI module 116 detects a stylus shaft removal gesture, and causes the separator 51 between the right viewing area 56 and the left viewing area 54 to remain at the last location of the stylus 1000 on the screen before it was lifted off the screen. Thus, the stylus shaft dragging gesture causes the right viewing area 56 to become smaller and the left viewing area 54 to become larger. The stylus 1000 can thus be used to resize the viewing areas of the touchscreen display.

Similarly, when the touchscreen display 45 is in a horizontal split mode with the main viewing area 102 divided into a top viewing area 55 and a bottom viewing area 57 with a horizontal separator 59, the combination of the horizontal stylus shaft placement gesture in the vicinity of the separator 59, followed by a shaft stylus shaft dragging gesture (e.g., up or down along the screen), and a stylus shaft removal may be used to cause the touchscreen display system 110 to resize the top and bottom viewing areas 55, 57.

Figure 11A:
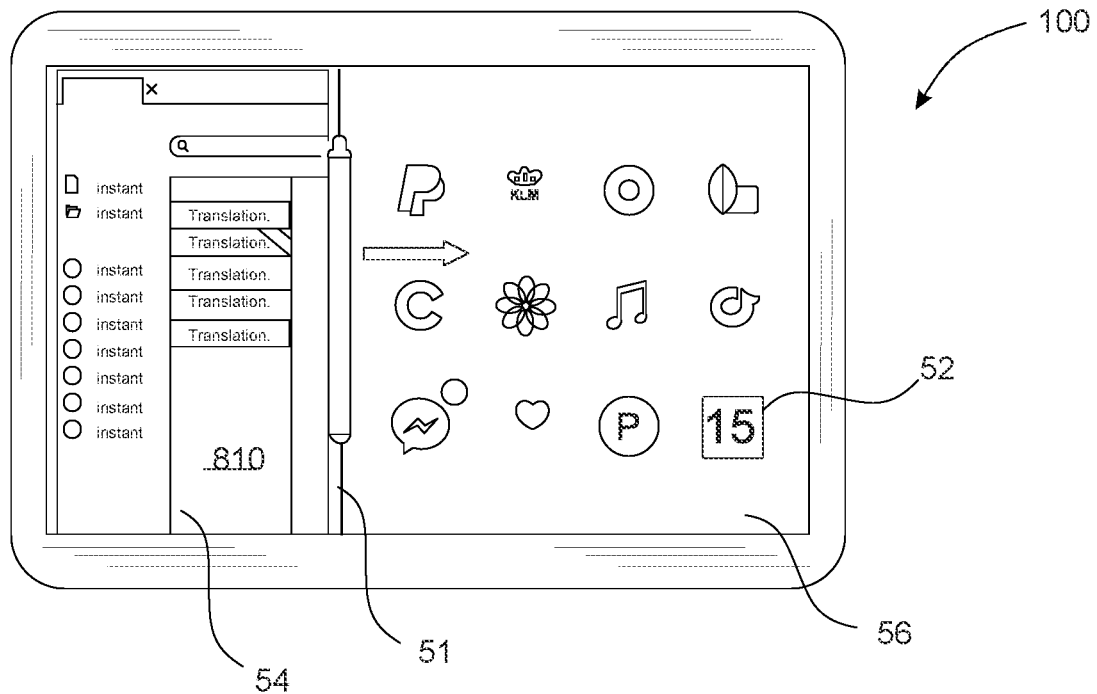
FIG. 11A shows the electronic device wherein the main viewing area of the touchscreen display has been split into first and second viewing areas separated by a separator, wherein the first viewing area displays the user interface of the running application and the second viewing area displays a plurality of icons representing available applications, and wherein a stylus is placed on the screen of the touchscreen display on the separator and dragged horizontally but quickly lifted off the screen.
Figure 11B:
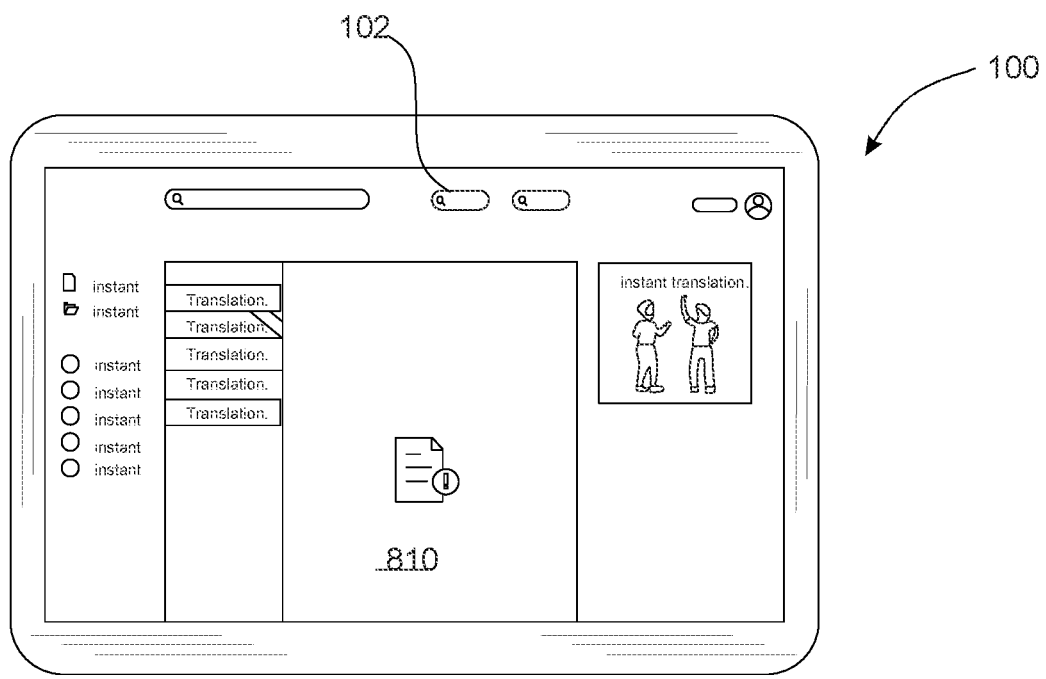
FIG. 11B shows the electronic device of FIG. 11A wherein the dragging and quick lifting of the stylus caused the user interface of the application running in the left viewing area to occupy the main viewing area and the right viewing area to be removed, in accordance with embodiments of the present disclosure.

In some example embodiments, the touchscreen display system 110 is configured to maximize a viewing area and/or close a viewing area in response to dragging movement of a rigid body such as stylus shaft 1010 on the screen of the touchscreen display 100. With reference to FIG. 11A, the display of the device 100 is split into a right viewing area 56 displaying a plurality of icons 52, and a left viewing area 54 displaying the user interface 810 of a foreground application. A stylus 1000 is placed on the screen of the display at the separator 510. The stylus 1000 is dragged briefly to the right towards the right viewing area and lifted suddenly off the screen while still being dragged there along. Accordingly, the stylus 1000 loses touch contact with the display while still in motion relative to the display. In response to lifting of the stylus shaft 1010 while still in motion from left to right, the touchscreen display system 110 causes the right viewing area 56 to be closed and the contents of the left viewing area 54, e.g., the user interface 810 of the foreground application, to be maximized to occupy the main viewing area 102 of the display. Thus, in example embodiments the touchscreen display system 110 is configured to detect a "stylus shaft drag and lift gesture" that corresponds to the stylus shaft being slid along the touchscreen display and then removed. Depending on a location and orientation of the detected stylus shaft drag and lift gesture, the UI module 116 causes one viewing area to be closed and a further viewing area to be enlarged. In some example configurations, the application that corresponds to the viewing area that is being closed may also be closed or terminated, and in some examples such application may just be transitioned to run as a background application.

Figure 12:
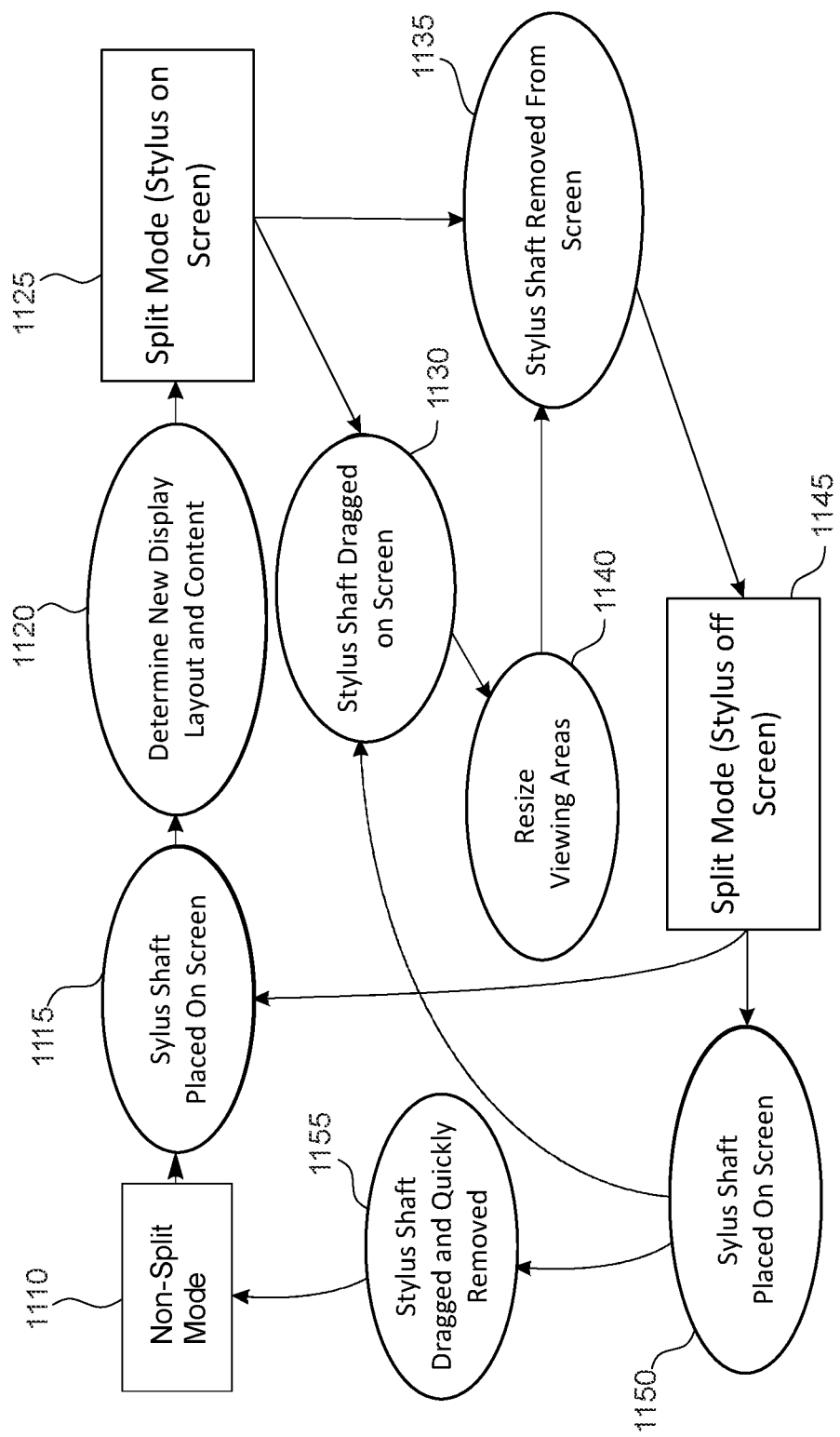
FIG. 12 depicts a state diagram showing the various states of a touchscreen display as a stylus engages the screen of the touchscreen display in a number of ways, in accordance with embodiments of the present disclosure.

An overview of the operation of touchscreen display system 110 of electronic device 100 in respect of the above examples will now be described with respect to FIG. 12. FIG. 12 is a state diagram showing the various states of touchscreen display system 110 (including touchscreen display 45) as a user interacts with the screen of the touchscreen display 45 using stylus 1000, according to example embodiments. State 1110 represents a scenario where the touchscreen display 45 is in a non-split mode. The main viewing area 102 of the touchscreen display 45 either displays the user interface for a single application (such as shown in FIG. 8C for example) or a home screen user interface including a plurality of icons (such as shown in FIG. 8A for example).

State 1115 represents a scenario where the touchscreen display system 110 detects, while in a non-split mode, a stylus shaft placement gesture. As a result, as represented at state 1120, touchscreen display system 110 determines a new display layout and content in response to the detected stylus shaft placement gesture. In particular, as will be appreciated from the examples described above, in example embodiments the UI module 116 is configured to select a new display layout (e.g., vertical split-mode or horizontal split-mode) and the content displayed in the viewing area(s) associated with a selected display mode based on one or more of the following: (1) the orientation of the detected stylus shaft placement gesture (e.g., vertical orientation or horizontal orientation); (2) the on-screen location of the stylus shaft 1010 within the display (e.g. coincident with a central vertical axis or central horizontal axis); (3) the current display content at the time the stylus shaft placement gesture is detected (e.g., is an OS home screen user interface being displayed in a viewing area?, or is an application user interface for a foreground application being displayed in a viewing area?); (4) current application status information (e.g., how many and what applications are currently running as background applications; how many and what applications are currently running as foreground applications); and (5) predefined parameters such as which inactive application is a default application.

In an example where the existing state is non-split mode, detection of a stylus shaft placement gesture generally aligned vertically or horizontally in a middle region of the touchscreen display 45 (e.g. as shown in FIG. 4A or 4B, respectively), will cause the touchscreen display system 110 to determine that the new display layout will be a vertical split mode or horizontal split mode, respectively. This new state and mode is represented at state 1125. State 1125 represents a scenario in which the touchscreen display 45 has a first and a second viewing areas (e.g. right and left viewing areas 56, 54 or top and bottom viewing areas 55, 57), and the stylus 1010 is still positioned on the screen. The content of the first and second viewing areas in state 1125 (e.g. home screen user interface, user interface for application previously running in backgrounds, and/or user interface for a newly launched default application) is determined at state 1120 based on the examples described above.

State 1135 represents a scenario where the touchscreen display system 110 detects a shaft stylus removal gesture in the case where the stylus shaft has been in the same position on the screen for at least a defined threshold time period (e.g., 0.5 seconds). In such a scenario, the first and second viewing areas remain at their current relative sizes determined by the last position of the stylus on the screen (state 1145).

State 1130 represents a scenario where touchscreen display system 110 detects that: (1) a stylus shaft previously placed on the touchscreen display 45 in a position that generally coincides with a separator 51 or 59 between two viewing areas is dragged along the screen to a new position while maintaining its general orientation (e.g., right or left stylus shaft drag gesture when stylus is in a generally vertical orientation, or an up or down stylus shaft gesture when the stylus is in a generally horizontal direction); and (2) after being dragged, the stylus shaft 1010 remains positioned on the screen for at least a predetermined time (e.g., 0.5 seconds) before being removed from the screen. In such a case, the touchscreen display system 110 resizes the viewing areas relative to one another proportional to the distance and direction that the stylus shaft 1010 has been dragged (State 1140) as described above in respect of FIGS. 10A and 10B State 1150 represents a scenario where touchscreen display system 110 detects a stylus shaft placement gesture that coincides generally with a separator 51 or 59 while the touchscreen display is in split screen mode. A possible state following state 1150 is state 1130, namely detection of a stylus shaft drag gesture that results in a resizing of the split mode viewing areas (state 1140). Another possible state following state 1150 is state 1155, where touchscreen display system 110 detects a stylus shaft drag and removal gesture that corresponds to the stylus shaft being dragged across the screen and removed within a threshold time period of termination of the dragging motion (e.g., less than 0.5 seconds). In such case the touchscreen display system 110 will cause the touchscreen display 45 to return to non-split mode (state 1110) in which one of the viewing areas will be maximized to fill an entire main viewing area and the other viewing area will be closed, such as described above in respect of FIGS. 11A and 11B.

The above disclosure discusses manipulating viewing areas of a display. In some examples, the viewing areas may correspond to user interface windows. Furthermore, in some examples, multiple viewing areas or windows could simultaneously display user interfaces from the same applications. For example, a word processing application may have a single document window in which a first document is displayed. Placing a stylus along the application window may cause the application to open a second document window within the area of the original application window. Similarly, a spreadsheet application displaying a single sheet may, in response to a stylus being placed along its window, create a second window containing a blank spreadsheet. As another example, placing a stylus along a border of an application window then moving the stylus can be used to resize the window in the same manner that it has been described above with respect to resizing a viewing area. As yet another example, an application window may be maximized by placing the stylus on the window border, dragging the stylus away from the window contents and towards the border of a viewing area, and lifting the stylus while dragging it.

Although the examples shown depicted splitting the main viewing area of a display into just two viewing areas by placement of a stylus shaft on a screen of a display, it would be understood by those of skill in the art that further splitting of viewing areas is also contemplated in this disclosure. For example, subsequent to splitting the main viewing into a right viewing area and a left viewing area, the stylus may be placed horizontally across the right viewing area. This splits the right viewing area into a top right viewing area and a bottom right viewing area. The contents of each of the newly created viewing area may be determined using the above-described methods.

In at least some examples, the ability to process stylus shaft gestures as disclosed herein may improve one or both of the operation of electronic device 100 and the user experience with the electronic device 100. For example, facilitating more efficient user interactions with electronic device 100 through the use of stylus shaft gestures may enable a desired screen display layout to be achieved with fewer user interactions, thereby reducing possible wear or damage to the electronic device 100 and possibly reducing battery power consumption. Furthermore, a user may be able to replace some finger interactions with the touchscreen display 45 with stylus interactions, thereby reducing potential transfer of foreign substances such as dirt, grease, oil and other contaminants (including for example bacteria and viruses) from the user's fingers to the touchscreen display 45. Reduced contaminants on the screen may in some cases reduce cleaning requirements for the touchscreen display thereby reducing possible damage to the device, reducing the consumption of cleaning materials, and may also reduce the spread of contaminates.

Figure 13:
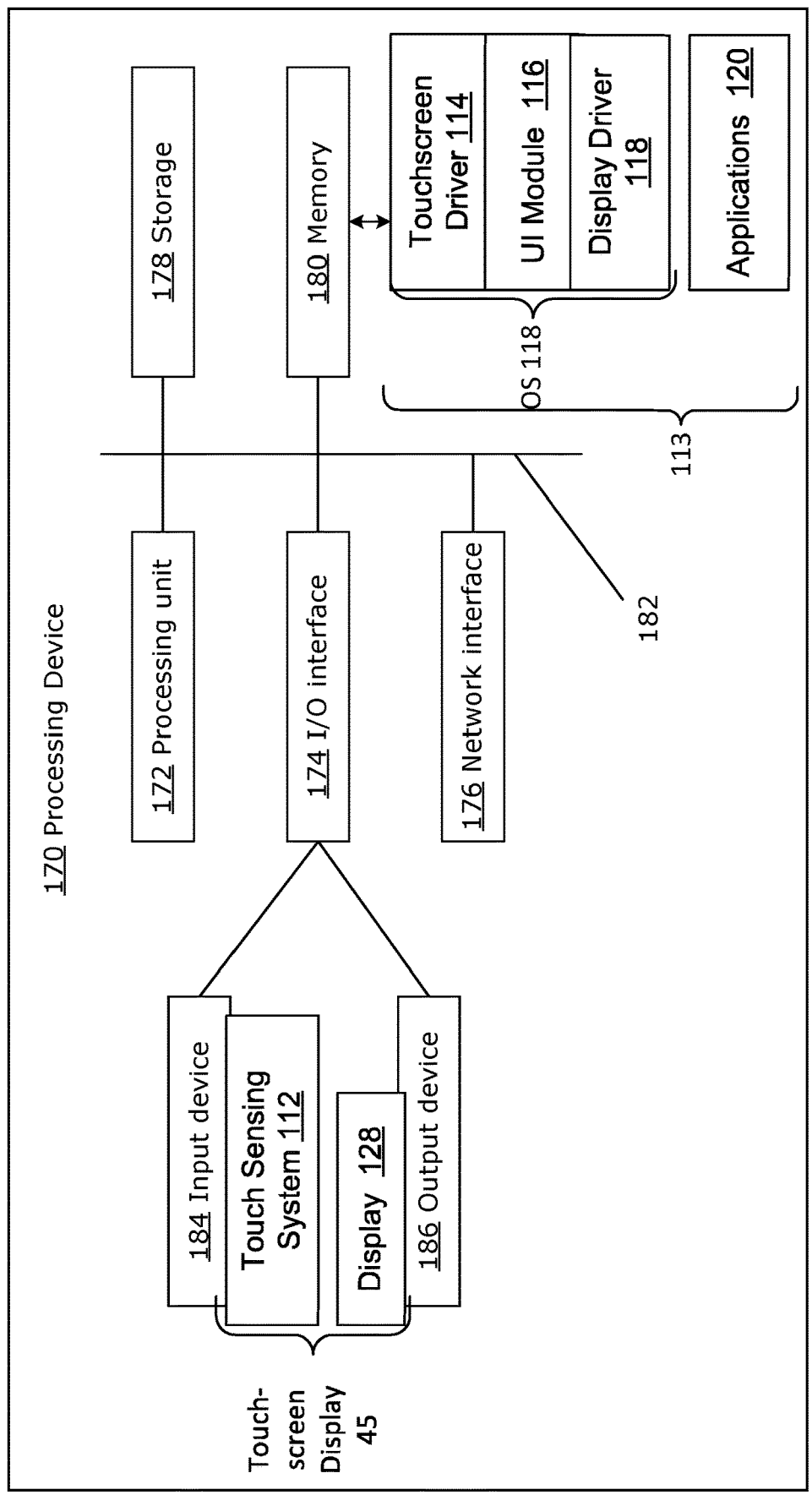
FIG. 13 depicts a block diagram representing an example electronic device capable of carrying out the methods described here, in accordance with embodiments of the present disclosure.

FIG. 13 is a block diagram of an example processing device 170, which includes the components of touchscreen display system 110 and may be used to implement the electronic device 100. The processing device 170 may be used to execute machine readable instructions, in order to implement methods and examples described herein. Other processing units suitable for implementing embodiments described in the present disclosure may be used, which may include components different from those discussed below. Although FIG. 13 shows a single instance of each component, there may be multiple instances of each component in the processing device 170.

The processing device 170 may include one or more processing units 172, such as a processor, a microprocessor, an application-specific integrated circuit (ASIC), a field-programmable gate array (FPGA), a dedicated logic circuitry, a tensor processing unit, a neural processing unit, or combinations thereof. The processing device 170 may also include one or more input/output (I/O) interfaces 174, which may enable interfacing with one or more appropriate input devices 184 and/or output devices 186. The processing device 170 may include one or more network interfaces 176 for wired or wireless communication with a network (e.g., an intranet, the Internet, a P2P network, a WAN and/or a LAN) or other node. The network interfaces 176 may include wired links (e.g., Ethernet cable) and/or wireless links (e.g., one or more antennas) for intra-network and/or inter-network communications.

The processing device 170 may also include one or more storage units 178, which may include a mass storage unit such as a solid state drive, a hard disk drive, a magnetic disk drive and/or an optical disk drive. The processing device 170 may include one or more memories 180, which may include a volatile (e.g. random access memory (RAM)) and non-volatile or non-transitory memories (e.g., a flash memory, magnetic storage, and/or a read-only memory (ROM)). The non-transitory memory(ies) of memories 180 store programs 113 that include software instructions for execution by the processing unit(s) 172, such as to carry out examples described in the present disclosure. In example embodiments the programs 113 include software instructions for implementing operating system (OS) 108 (which as noted above can include touchscreen driver 114, UI module 116 and display driver 118, among other OS components) and other applications/functions 120. In some examples, memory 180 may include software instructions of the system 100 for execution by the processing unit 172 to carry out the methods of the present disclosure. In some other examples, one or more data sets and/or modules may be provided by an external memory (e.g., an external drive in wired or wireless communication with the processing device 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing device 170, including the processing units(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 13, the input device(s) 184 include touch sensing system 112 of the touchscreen display 45, and may also include other input devices (e.g., a keyboard, a mouse, a microphone, accelerometer, and/or a keypad) Output device(s) 186 includes the display 128 of touch-screen display 24 and may also include other devices such as a speaker and a tactile generator.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
sensing a touch event on a touchscreen display of an electronic device; and
changing a display layout rendered on the touchscreen display in response to determining that the touch event matches a stylus shaft gesture corresponding to interaction of the stylus shaft with the touchscreen display, the stylus shaft located between a first end and a second end of a stylus;
wherein determining that the touch event matches a stylus shaft gesture comprises determining that touch coordinate information for the touch event matches a stylus shaft drag gesture that corresponds to movement along a screen of the touchscreen display of the stylus shaft from a location that coincides with a border between a first viewing area and a second viewing area, and wherein changing the display layout rendered on the touchscreen display comprises resizing relative sizes of the first viewing area and the second viewing area based on the movement of the stylus shaft along the screen.

2. The method of claim 1, wherein the first viewing area is a right viewing area and the second viewing area is a left viewing area.

3. The method of claim 1, wherein the first viewing area is a top viewing area and the second viewing area is a bottom viewing area.

4. A method comprising:
sensing a touch event on a touchscreen display of an electronic device; and
changing a display layout rendered on the touchscreen display in response to determining that the touch event matches a stylus shaft gesture corresponding to interaction of the stylus shaft with the touchscreen display, the stylus shaft located between a first end and a second end of a stylus;
wherein determining that the touch event matches a stylus shaft gesture comprises determining that, when a first viewing area and a second viewing area are displayed on the touchscreen display, touch coordinate information for the touch event matches a stylus shaft drag and remove gesture that corresponds to movement along a screen of the touchscreen display of the stylus shaft within a first viewing area and subsequent removal of the stylus shaft from the screen within a threshold time period of the movement, and wherein changing the display layout rendered on the touchscreen display comprises enlarging the first viewing area and closing the second viewing area.

5. The method of claim 4, wherein the first viewing area is a right viewing area and the second viewing area is a left viewing area.

6. The method of claim 4, wherein the first viewing area is a top viewing area and the second viewing area is a bottom viewing area.

7. An electronic device comprising:
a touchscreen display comprising a display and a touch sensing system configured to generate signals corresponding to screen touches of the display;
a processing device operatively coupled to the touchscreen display; and
a non-transitory memory coupled to the processing device and storing software instructions that when executed by the processing device configure the processing device to:
sense a touch event on the touchscreen display based on signals generated by the touch sensing system; and
change a display layout rendered on the touchscreen display in response to determining that the touch event matches a stylus shaft gesture that corresponds to interaction of the stylus shaft with the touchscreen display, the stylus shaft located between a first end and a second end of a stylus;

wherein determining that the touch event matches a stylus shaft gesture comprises determining that, when a first viewing area and a second viewing area are displayed on the touchscreen display, touch coordinate information for the touch event matches a stylus shaft drag and remove gesture that corresponds to movement along a screen of the touchscreen display of the stylus shaft within a first viewing area and subsequent removal of the stylus shaft from the screen within a threshold time period of the movement, and wherein changing the display layout rendered on the touchscreen display comprises enlarging the first viewing area and closing the second viewing area.

8. The electronic device of claim 7, wherein the first viewing area is a right viewing area and the second viewing area is a left viewing area.

9. The electronic device of claim 7, wherein the first viewing area is a top viewing area and the second viewing area is a bottom viewing area.

10. The electronic device of claim 7, wherein the touchscreen display comprises a capacitive screen and the touch input tool has a shaft comprising a plurality of spaced apart conductive contact points for contacting the capacitive screen.

11. The electronic device of claim 10, wherein the conductive contact points are electrically connected to one or more human user contact surfaces on the touch input tool, to allow a conductive path from a human user to the conductive contact points.

12. The electronic device of claim 1, wherein the touchscreen display is a resistive touchscreen display including a screen that comprises a metallic electrically conductive coating and resistive layer.

13. The electronic device of claim 1, wherein the touchscreen display is an infrared touchscreen including a touch sensing system that utilizes a matrix of infrared beams transmitted by light emitting diodes (LEDs) and a phototransistor receiving end.

14. An electronic device comprising:
a touchscreen display comprising a display and a touch sensing system configured to generate signals corresponding to screen touches of the display;
a processing device operatively coupled to the touchscreen display; and
a non-transitory computer readable medium storing instructions which when executed by a processor of an electronic device, configures the electronic device to:
sense a touch event on the touchscreen display of the electronic device; and
change a display layout rendered on the touchscreen display in response to determining that the touch event matches a stylus shaft gesture corresponding to interaction of the stylus shaft with the touchscreen display, the stylus shaft located between a first end and a second end of a stylus;

wherein determining that the touch event matches a stylus shaft gesture comprises determining that touch coordinate information for the touch event matches a stylus shaft drag gesture that corresponds to movement along a screen of the touchscreen display of the stylus shaft from a location that coincides with a border between a first viewing area and a second viewing area, and wherein changing the display layout rendered on the touchscreen display comprises resizing relative sizes of the first viewing area and the second viewing area based on the movement of the stylus shaft along the screen.

15. The electronic device of claim 14, wherein the first viewing area is a right viewing area and the second viewing area is a left viewing area.

16. The electronic device of claim 14, wherein the first viewing area is a top viewing area and the second viewing area is a bottom viewing area.

17. The electronic device of claim 14, wherein the touchscreen display comprises a capacitive screen and the touch input tool has a shaft comprising a plurality of spaced apart conductive contact points for contacting the capacitive screen.

18. The electronic device of claim 14, wherein the conductive contact points are electrically connected to one or more human user contact surfaces on the touch input tool, to allow a conductive path from a human user to the conductive contact points.

19. The electronic device of claim 14, wherein the touchscreen display is a resistive touchscreen display including a screen that comprises a metallic electrically conductive coating and resistive layer.

20. The electronic device of claim 14, wherein the touchscreen display is an infrared touchscreen including a touch sensing system that utilizes a matrix of infrared beams transmitted by LEDs and a phototransistor receiving end.

* * * * *